United States Patent [19]

Galkowski

[11] Patent Number: 4,803,651

[45] Date of Patent: Feb. 7, 1989

[54] METHOD FOR ENCODING AND DECODING ACYCLIC, LINKED-LIST DATA STRUCTURES FOR EFFICIENT STORAGE, RETRIEVAL AND SEARCHING

[75] Inventor: Jan T. Galkowski, Endicott, N.Y.

[73] Assignee: IBM Corporation, Armonk, N.Y.

[21] Appl. No.: 827,690

[22] Filed: Feb. 10, 1986

[51] Int. Cl.$^4$ ............... G06F 9/40; G06F 15/40; G06F 12/08

[52] U.S. Cl. ............................ 364/900; 364/300

[58] Field of Search ... 364/200 MS File, 900 MS File

[56] References Cited

U.S. PATENT DOCUMENTS

| | | | |
|---|---|---|---|
| 3,670,310 | 6/1972 | Bharwani et al. | 364/200 |
| 3,737,864 | 6/1973 | Werner | 364/200 |
| 4,047,248 | 9/1987 | Lyman et al. | 364/900 |
| 4,064,489 | 12/1977 | Babb | 364/200 |
| 4,068,298 | 1/1978 | Dechant et al. | 364/200 |
| 4,086,629 | 4/1978 | Desyllas et al. | 364/200 |
| 4,149,240 | 4/1979 | Misunas et al. | 364/200 |
| 4,283,771 | 8/1981 | Chang | 364/900 |
| 4,322,815 | 3/1982 | Broughton | 364/900 |
| 4,429,385 | 1/1984 | Cichelli et al. | 364/900 |
| 4,606,002 | 8/1986 | Waisman et al. | 364/300 |

OTHER PUBLICATIONS

Bobrow, "A Note on Hash Linking", *Communications of the ACM*, vol. 18, No. 7, Jul. 1975, pp. 413–415.

Bobrow et al, "Compact Encodings of List Structure", *ACM Transactions on Programming Languages and Systems*, vol. 1, No. 2, Oct. 1979, pp. 266–286.

Steele, "Data Representation in PDP-10 MACLISP", MIT A. I. Memo No. 420, NTIS Report AD-A052-305, Apr. 1978.

Knuth, *The Art of Computer Programming*, vol. 1, "Fundamental Algorithms", 2nd ed, Addison Wellsley, pp. 408 et seq.

D. Comer, "The Ubiquitous B-Tree", Computing Surveys, vol. 11, No. 2, Jun. 1979, pp. 121–137.

Primary Examiner—Felix D. Gruber
Attorney, Agent, or Firm—Pollock, Vande Sande & Priddy

[57] ABSTRACT

To encode hierarchial information the invention recognizes that there is implicit information which must be made explicit. Thus the hierarchial information is annotated by selectively adding to it two spatial representing characters, each instance of a first spatial representing character corresponds to a unit step to the right, each instance of a second spatial representing character represents a unit identation to the left, and the first instance of the second spatial representing character in a string of the second spatial representing characters also represents a carriage return and line feed. The annotated hierarchial information is then scanned to produce two byproduct strings. The first byproduct string is merely the sequence of first and second spatial representing characters, in the order in which they appear, to which is added two place holding characters, one representing an alpha-numeric string, and the second representing a string of one or more blank or null characters. The second byproduct string is merely the concatenation of the alpha-numeric strings appearing in the hierarchial information. The first and second byproduct strings are then stored. The method is reversible so tht the encoded and stored hierarchial data structure (including its contents) can be retrieved and reconstituted. The encoded stored hierarchy (and its contents) can also be rapidly searched in its encoded form.

14 Claims, 23 Drawing Sheets

FIG. 1A

1. Physical Machines and Their Abstract Counterparts

↑I  1.0 What is a Machine?
       1.1 About Definitions
       1.2 Machines as Physical Models of Abstract Processes
       ↑II Part One. Finite State Machines
↑I 2. Finite State Machines ↑III  2.0 Introduction
        2.1 States and Signals
        2.2 Equivalent Histories: Internal States
        2.3 State Transition Tables and Diagrams
        ↑IV 3. Neural Networks. Automata Made Up of Parts ↑III  3.0 Introduction
        3.1 The "Cells" of McCulloch and Pitts
        3.6 Universal Sets of Cells
        ↑IV Part Two. Infinite Machines
↑I 6. Turing Machines ↑II  6.0 Introduction
       6.1 Some Examples of Turing Machines
       6.2 Discussion of Turing Machine Efficiency
       ↑IV

```
( ( ( 1. PHYSICAL MACHINES AND THEIR ABSTRACT COUNTERPARTS)
    ( ( 1.0 WHAT IS A MACHINE?)
      ( 1.1 ABOUT DEFINITIONS)
      ( 1.2 MACHINES AS PHYSICAL MODELS OF ABSTRACT PROCESSES) ) )
  ( ( PART ONE. FINITE STATE MACHINES.)
    ( ( ( 2. FINITE STATE MACHINES)
        ( ( 2.0 INTRODUCTION)
          ( 2.1 STATES AND SIGNALS)
          ( 2.2 EQUIVALENT HISTORIES: INTERNAL STATES)
          ( 2.3 STATE TRANSITION TABLES AND DIARGAMS) ) )
      ( ( 3. NEURAL NETWORKS. AUTOMATA MADE UP OF PARTS.)
        ( ( 3.0 INTRODUCTION)
          ( 3.1 THE CELLS OF MCCULLOCH AND PITTS)
          ( 3.6 UNIVERSAL SETS OF CELLS) ) ) ) )
  ( ( PART TWO. INFINITE MACHINES)
    ( ( ( 6. TURING MACHINES)
        ( ( 6.0 INTRODUCTION)
          ( 6.1 SOME EXAMPLES OF TURING MACHINES)
          ( 6.2 DISCUSSION OF TURING MACHINE EFFICIENCY) ) ) ) )
```

FIG.2

```
( ( ( 1. PHYSICAL MACHINES AND THEIR ABSTRACT COUNTERPARTS)
( ( 1.0 WHAT IS A MACHINE?)
( 1.1 ABOUT DEFINITIONS)
( 1.2 MACHINES AS PHYSICAL MODELS OF ABSTRACT PROCESSES) ) )
( ( PART ONE. FINITE STATE MACHINES.)
( ( ( 2. FINITE STATE MACHINES)
( ( 2.0 INTRODUCTION)
( 2.1 STATES AND SIGNALS)
( 2.2 EQUIVALENT HISTORIES: INTERNAL STATES)
( 2.3 STATE TRANSITION TABLES AND DIARGAMS) ) )
( ( 3. NEURAL NETWORKS. AUTOMATA MADE UP OF PARTS.)
( ( 3.0 INTRODUCTION)
( 3.1 THE CELLS OF MCCULLOCH AND PITTS)
( 3.6 UNIVERSAL SETS OF CELLS) ) ) ) )
( ( PART TWO. INFINITE MACHINES)
( ( ( 6. TURING MACHINES)
( ( 6.0 INTRODUCTION)
( 6.1 SOME EXAMPLES OF TURING MACHINES)
( 6.2 DISCUSSION OF TURING MACHINE EFFICIENCY) ) ) ) )
```

FIG.3

($^1$ ($^2$ ($^3$1. PHYSICAL MACHINES AND THEIR ABSTRACT COUNTERPARTS)$^2$ ($^3$ ($^4$1.0 WHAT IS A MACHINE?)$^3$ ($^4$1.1 ABOUT DEFINITIONS)$^3$ ($^4$1.2 MACHINES AS PHYSICAL MODELS OF ABSTRACT PROCESSES)$^3$)$^2$)$^1$ ($^2$ ($^3$PART ONE. FINITE STATE MACHINES.)$^2$ ($^3$ ($^4$ ($^5$2. FINITE STATE MACHINES)$^4$ ($^5$ ($^6$2.0 INTRODUCTION)$^5$ ($^6$2.1 STATES AND SIGNALS)$^5$ ($^6$2.2 EQUIVALENT.HISTORIES: INTERNAL STATES)$^5$ ($^6$2.3 STATE TRANSITION TABLES AND DIARGAMS)$^5$)$^4$)$^3$ ($^4$ ($^5$3. NEURAL NETWORKS. AUTOMATA MADE UP OF PARTS.)$^4$ ($^5$ ($^6$3.0 INTRODUCTION)$^5$ ($^6$3.1 THE CELLS OF MCCULLOCH AND PITTS)$^5$ ($^6$3.6 UNIVERSAL SETS OF CELLS)$^5$)$^4$)$^3$)$^2$)$^1$ ($^2$ ($^3$PART TWO. INFINITE MACHINES)$^2$ ($^3$ ($^4$6. TURING MACHINES)$^3$ ($^4$ ($^5$ ($^6$6.0 INTRODUCTION)$^5$ ($^6$6.1 SOME EXAMPLES OF TURING MACHINES)$^5$ ($^6$6.2 DISCUSSION OF TURING MACHINE EFFICIENCY)$^5$)$^4$)$^3$)$^2$)$^1$)$^0$

FIG.4

FIG. 5A  FIRST BYPRODUCT

```
2,1,2,1,2,3,1,3,1,3,1,3,1,3,1,3,1,3,0,1,2,1,2,3,1,3,1,
  3,1,3,1,3,0,1,2,3,1,3,1,3,0,1,2,3,1,3,1,3,1,3,1,3,1,3,1,
3,1,3,0,1,0,1,0,1,2,1,2,3,1,3,1,3,1,3,1,3,0,1,2,1,2,1,
2,3,1,3,1,3,1,3,0,1,2,1,2,3,1,3,0,1,2,3,1,3,1,3,1,3,0,1,
2,3,1,3,1,3,1,3,1,3,0,1,2,3,1,3,1,3,1,3,1,3,0,1,0,
1,0,1,2,1,2,3,1,3,1,3,1,3,1,3,1,3,1,3,0,1,2,1,2,3,1,
3,0,1,2,3,1,3,1,3,1,3,1,3,1,3,0,1,2,3,1,3,1,3,1,3,
1,3,0,1,0,1,0,1,0,1,2,1,2,3,1,3,1,3,1,3,0,1,2,1,2,1,
2,3,1,3,1,3,0,1,2,1,2,3,1,3,0,1,2,3,1,3,1,3,1,3,1,3,1,
3,0,1,2,3,1,3,1,3,1,3,1,3,0,1,0,1,0,1,0,1,0,1,0
```

SECOND BYPRODUCT

1.,PHYSICAL,MACHINES,AND,THEIR,ABSTRACT,COUNTERPARTS,1.0,WHAT,IS,A,
MACHINE?,1.1,ABOUT,DEFINITIONS,1.2,MACHINES,AS,PHYSICAL,MODELS,OF,
ABSTRACT,PROCESSES,PART,ONE.,FINITE,STATE,MACHINES.,2.,FINITE,
STATE,MACHINES,2.0,INTRODUCTION.,2.1,STATES,AND,SIGNALS,2.2,EQUIVALENT,
HISTORIES:,INTERNAL,STATES,2.3,STATE,TRANSITION,TABLES,AND,DIAGRAMS,
3.,NEURAL,NETWORKS.,AUTOMATA,MADE,UP,OF,PARTS.,3.0,INTRODUCTION,
3.1,THE,"CELLS",OF,MCCULLOCH,AND,PITTS,3.6,UNIVERSAL,SETS,OF,CELLS,
PART,TWO.,INFINITE,MACHINES,6.,TURING,MACHINES.,6.0,INTRODUCTION,
6.1,SOME,EXAMPLES,OF,TURING,MACHINES.,6.2,DISCUSSION,OF,TURING,
MACHINE,EFFICIENCY

FIG. 5B  ENCODING FOR HIERARCHICAL INFORMATION OF FIGURE 1

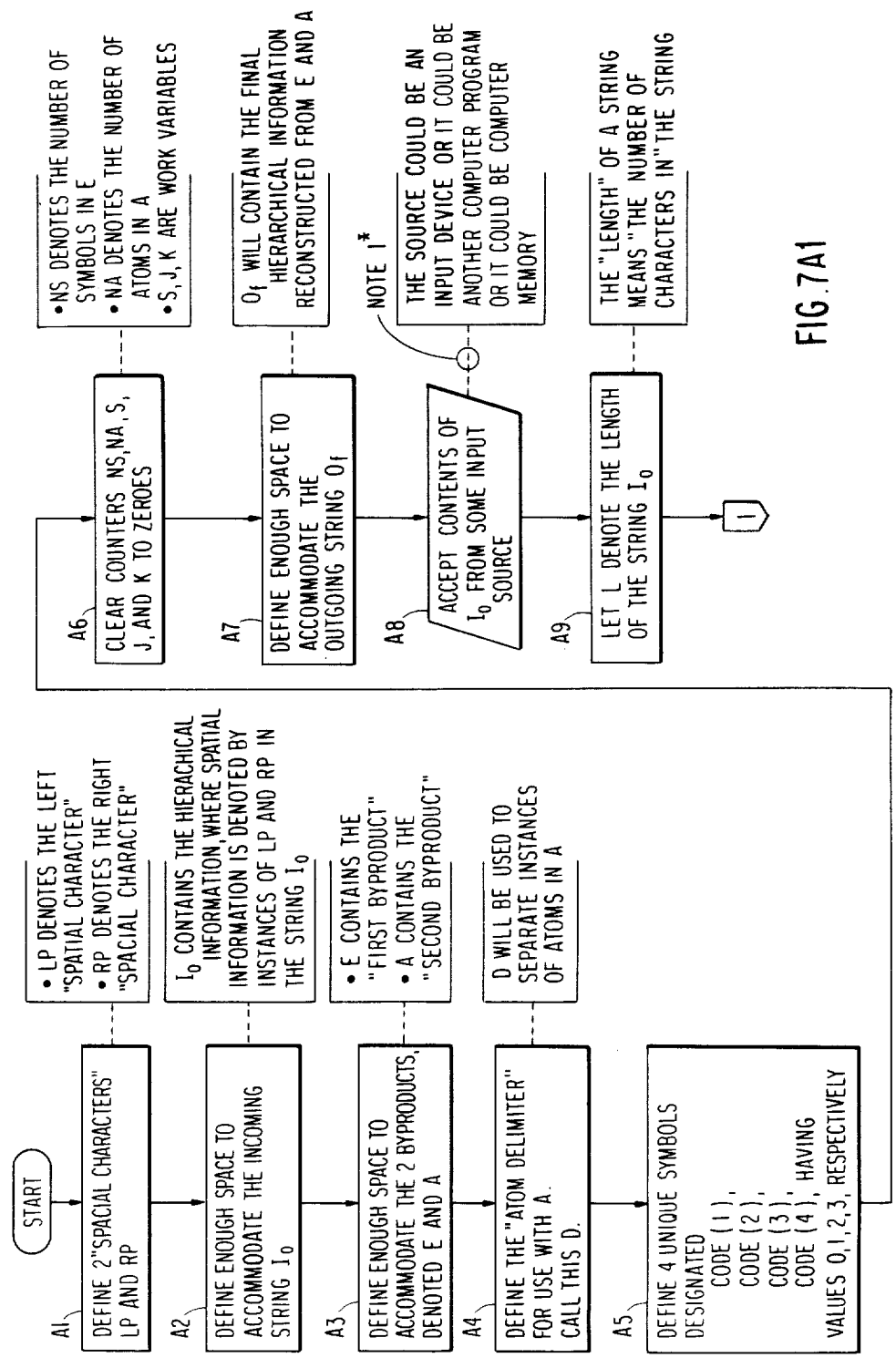
FIG. 7A1

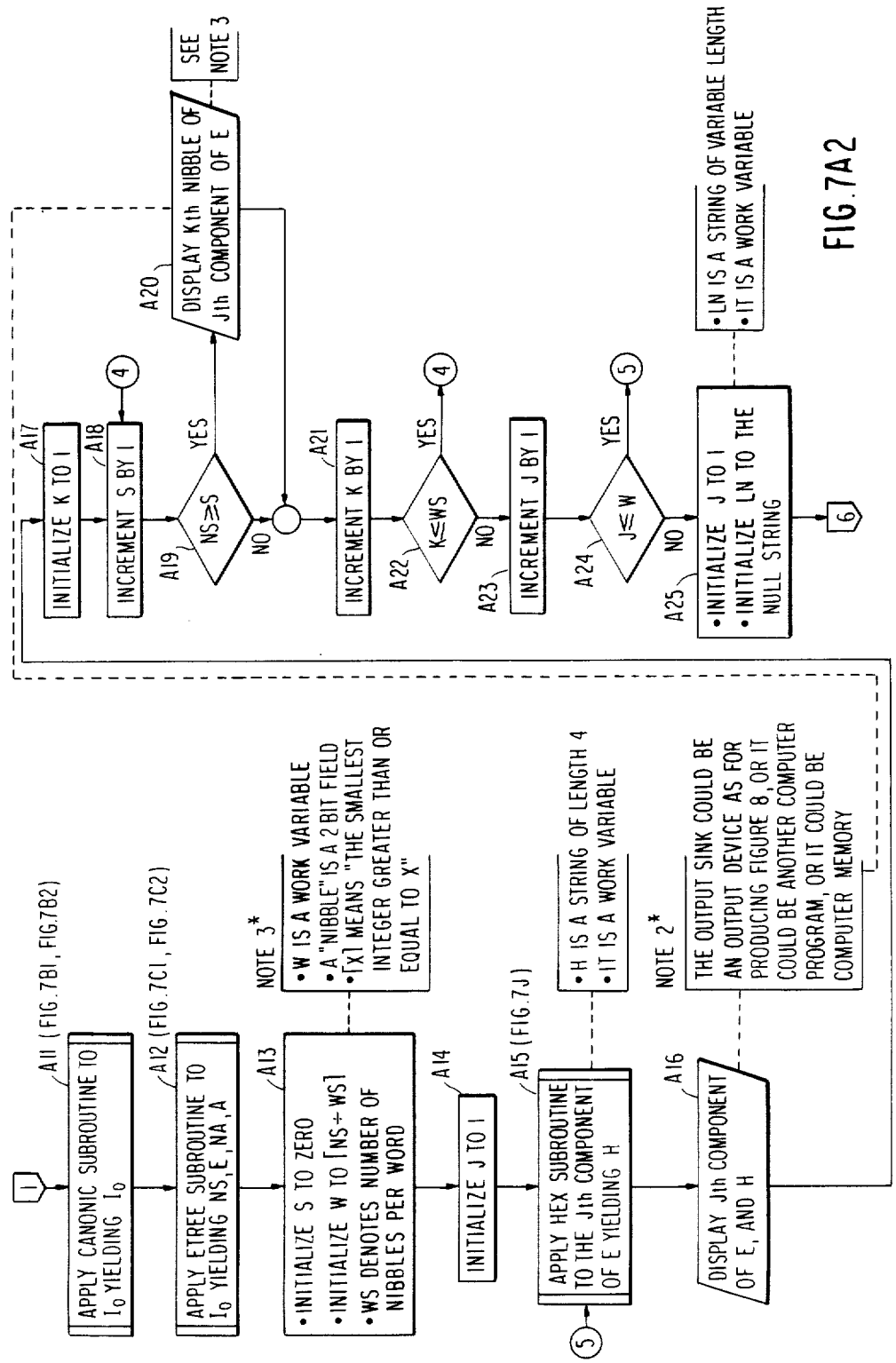

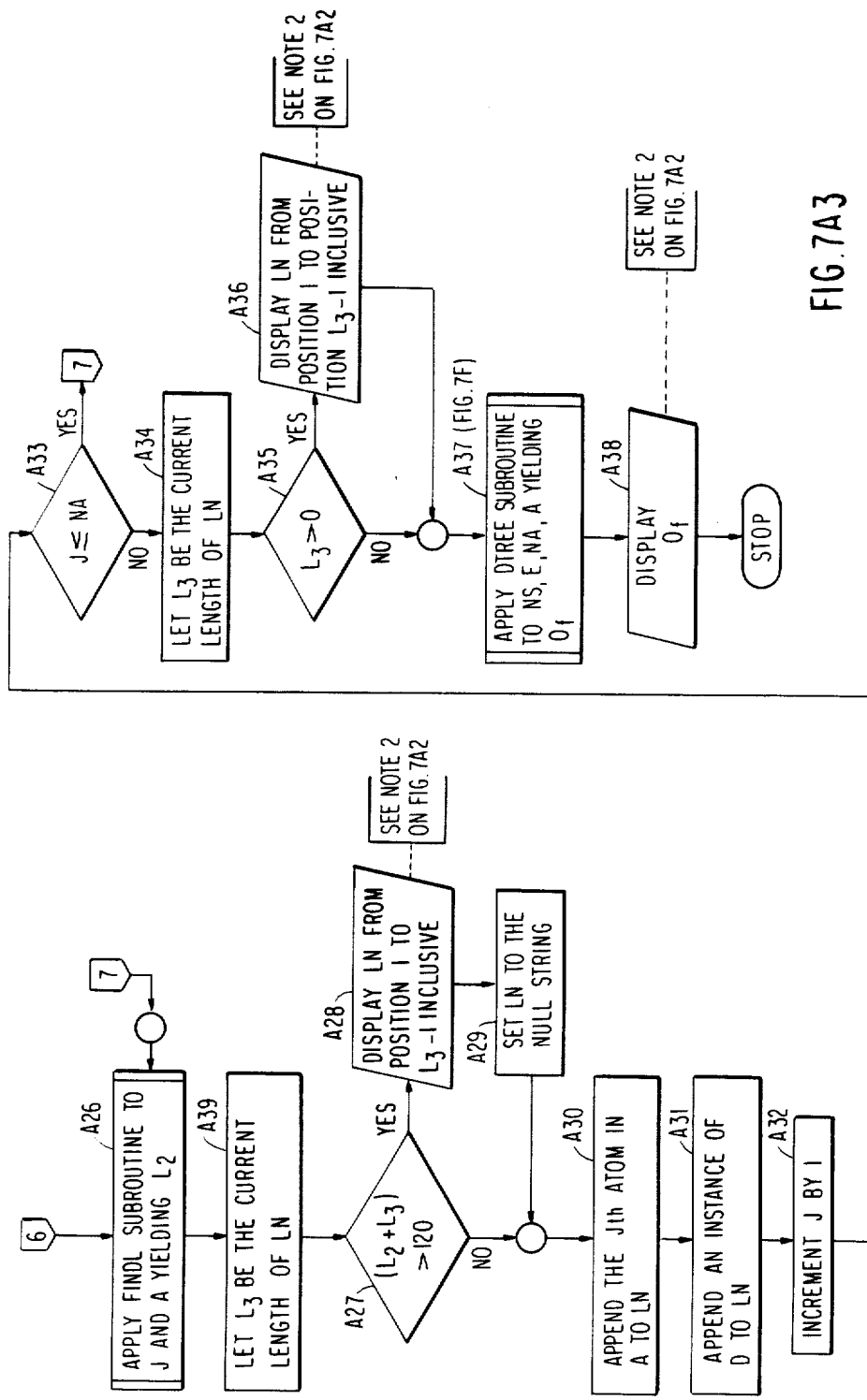
FIG. 7A3

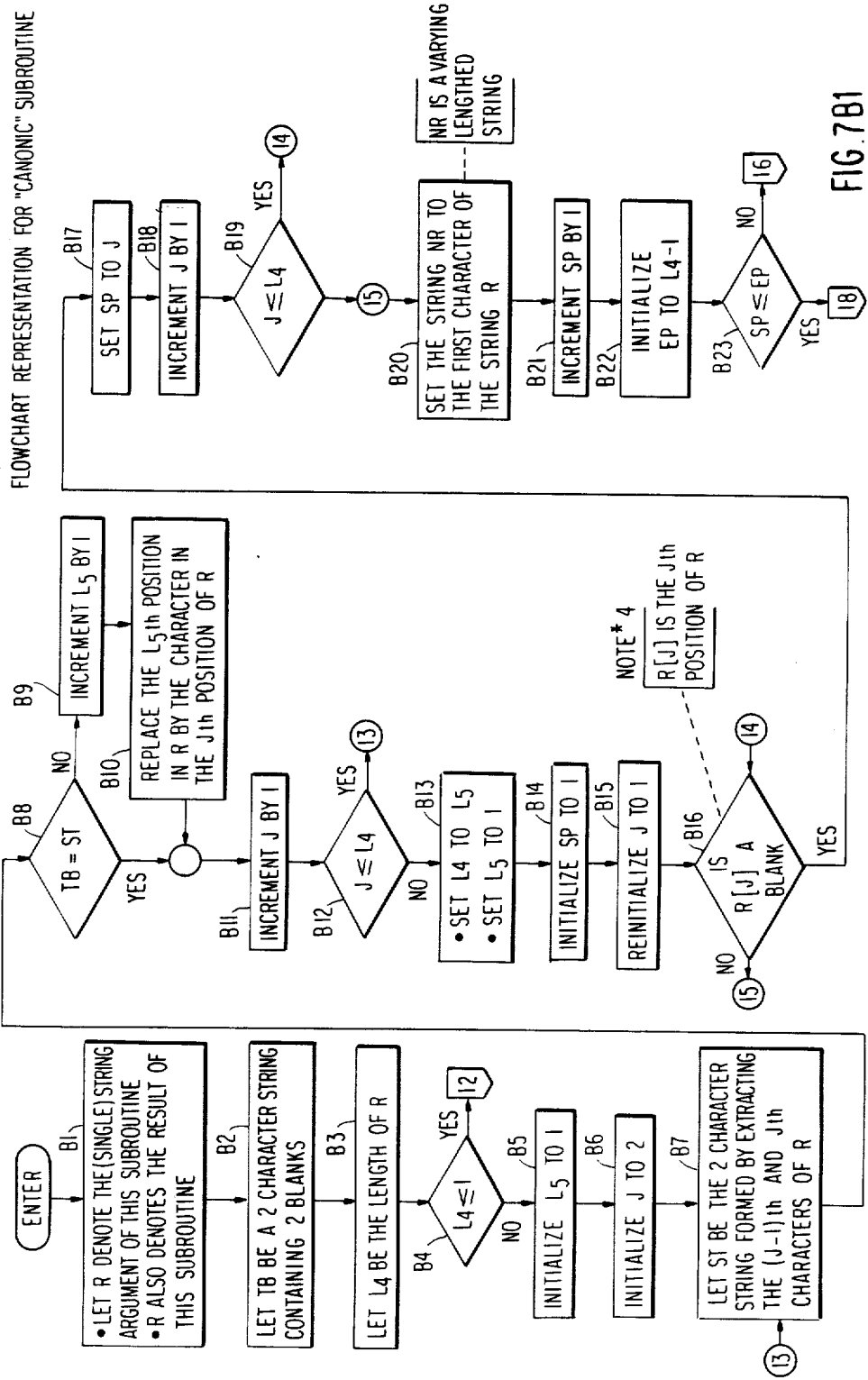

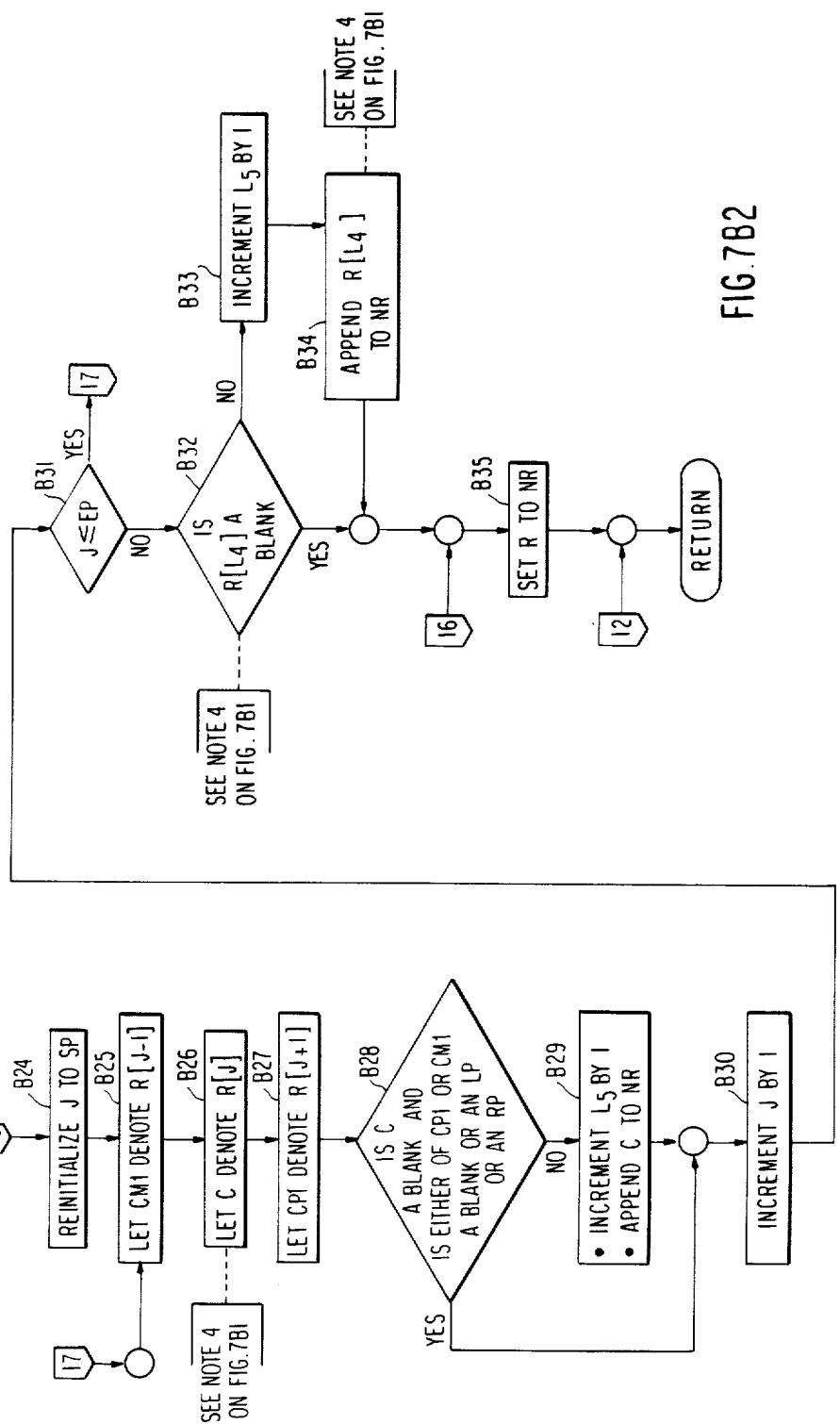
FIG. 7B2

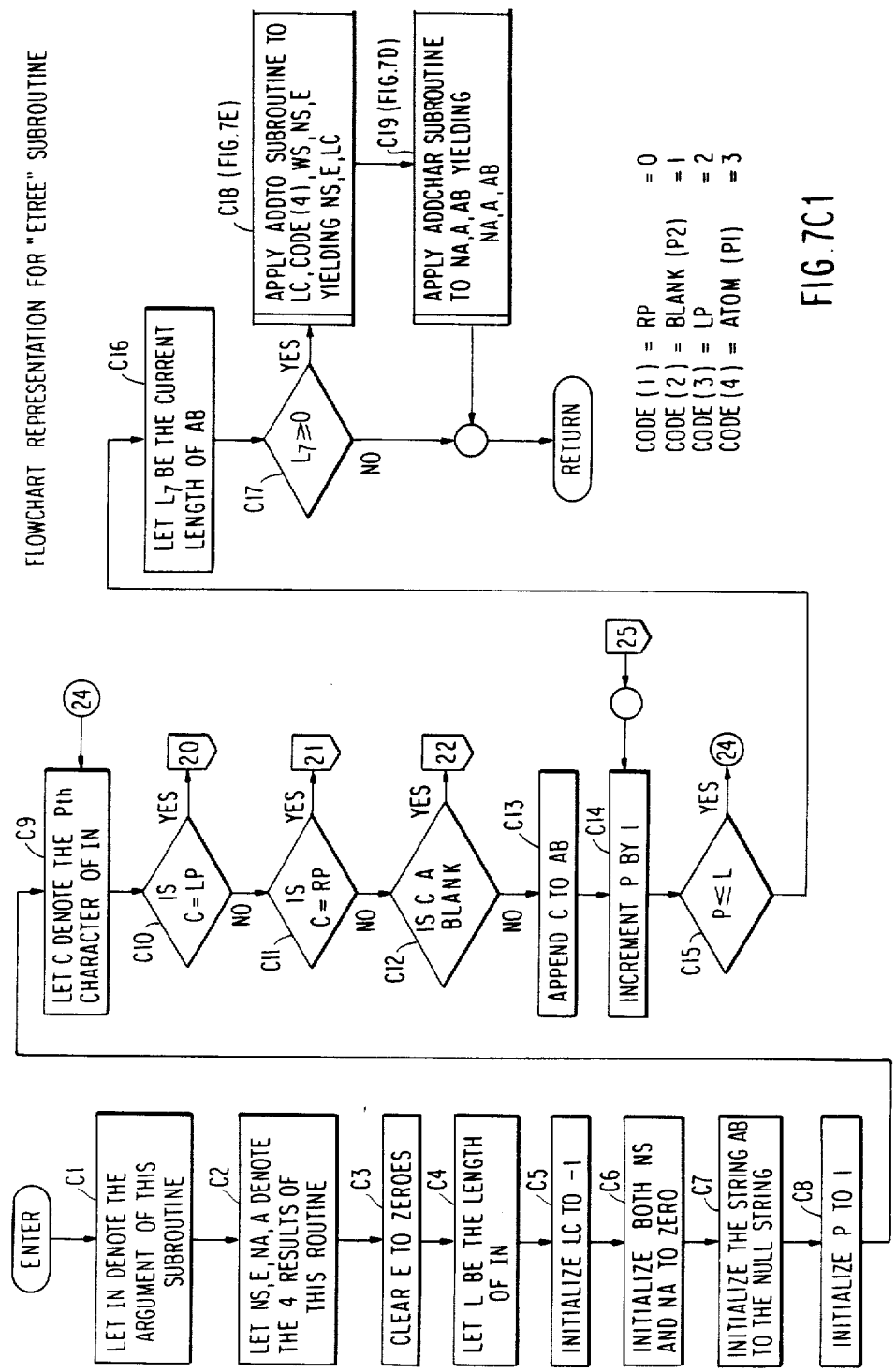

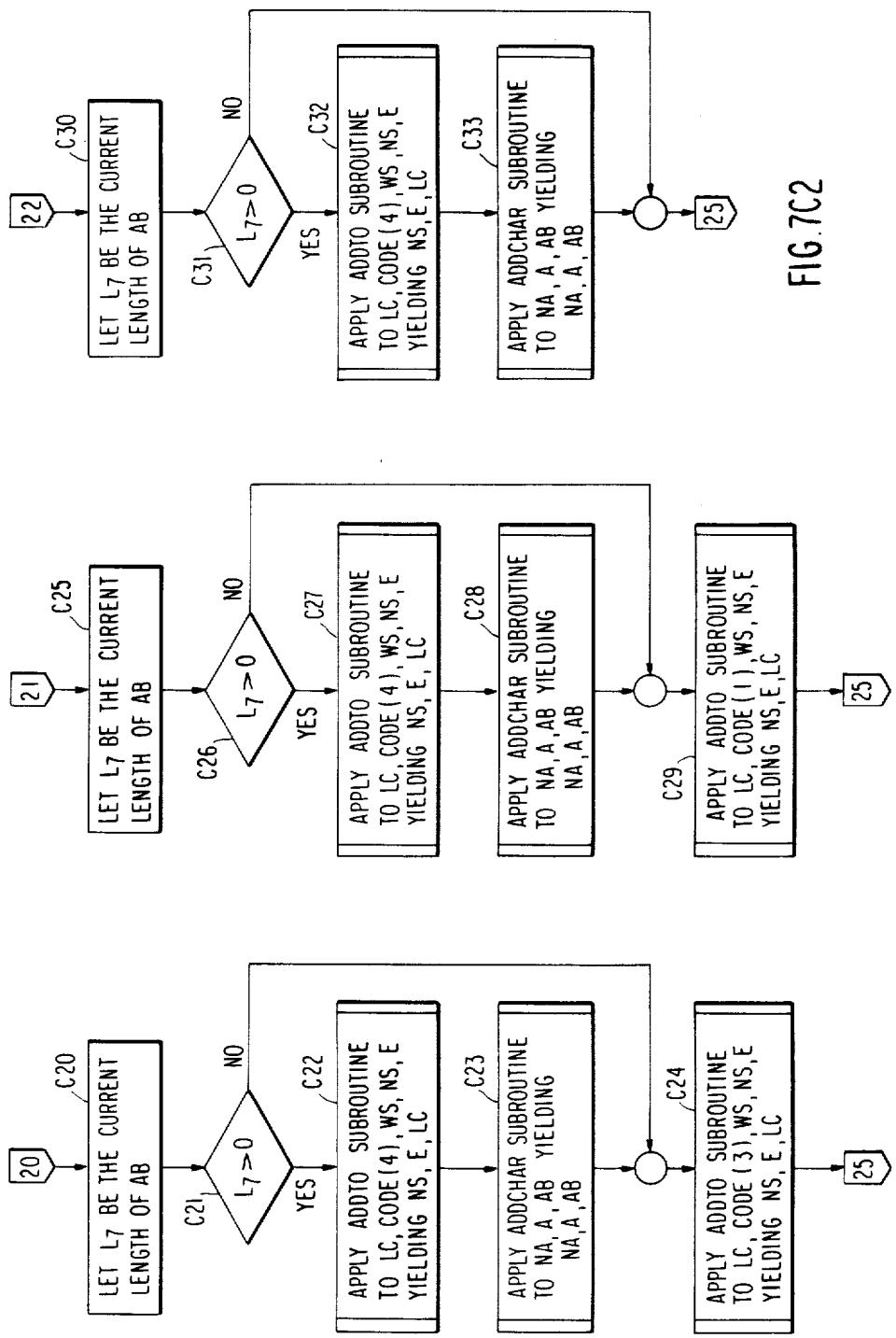
FIG.7C2

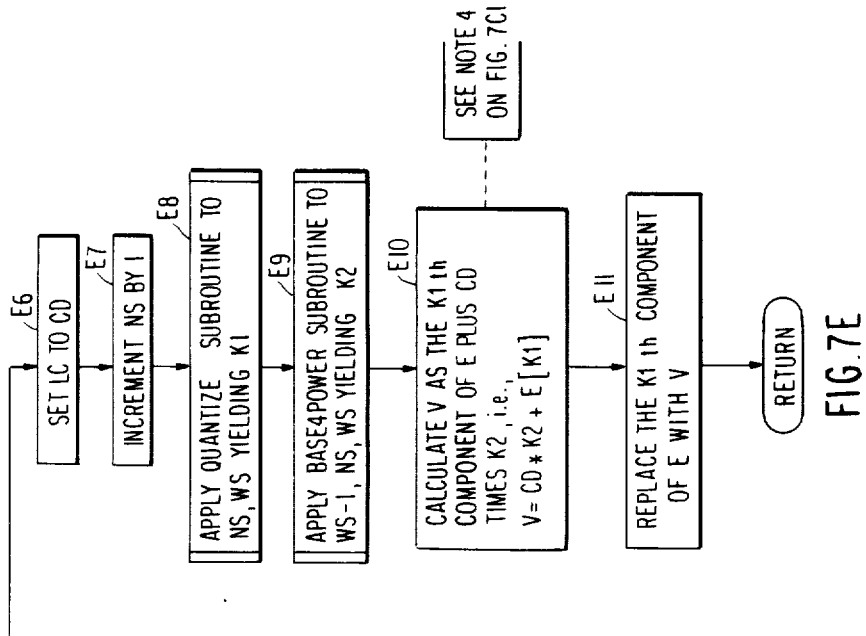
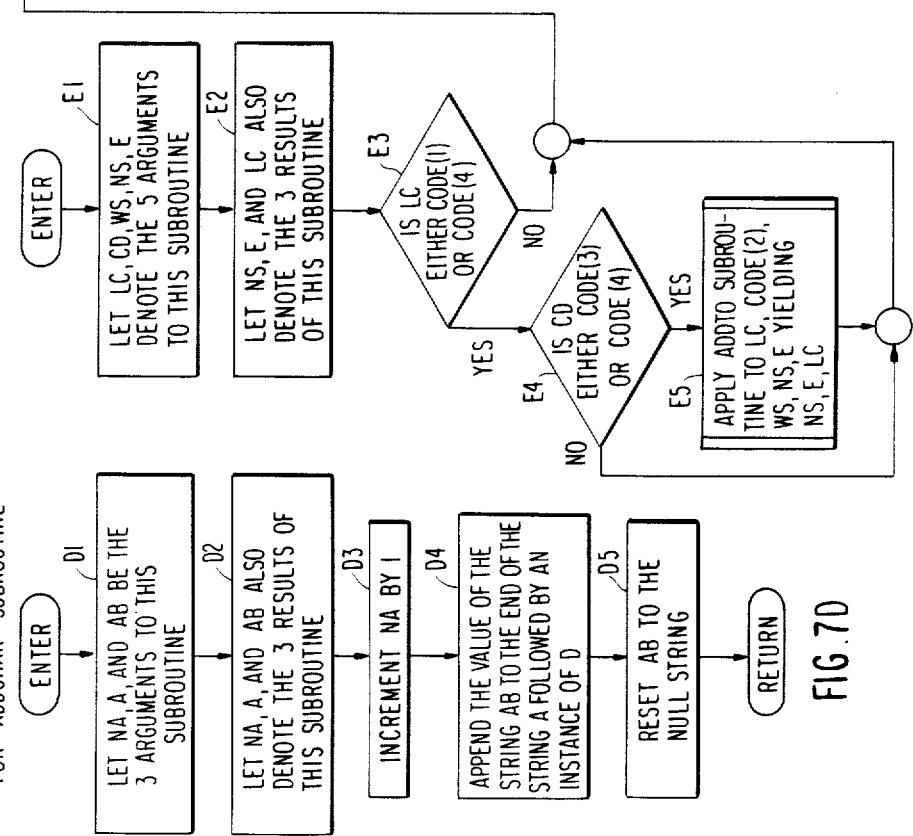

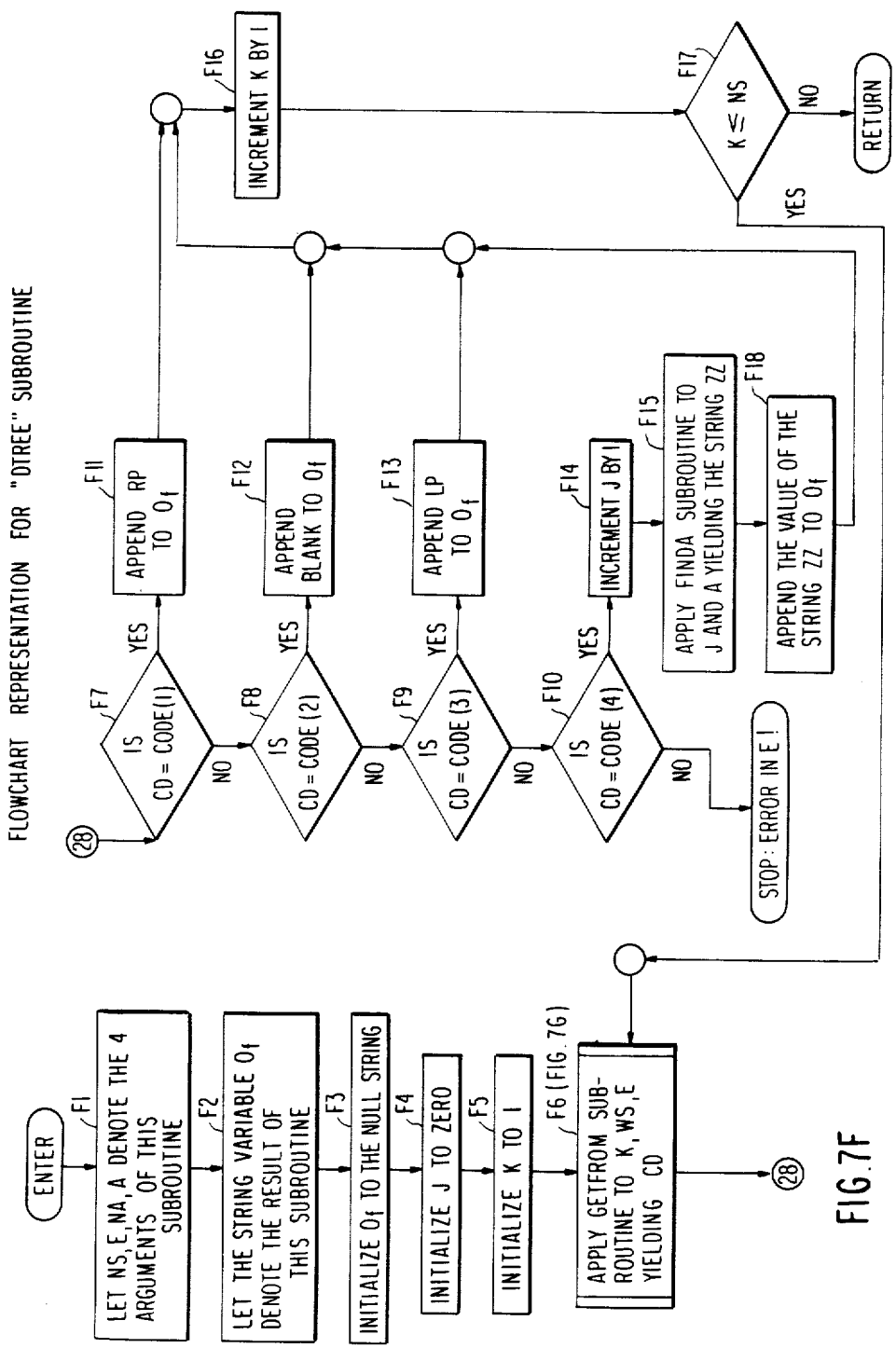

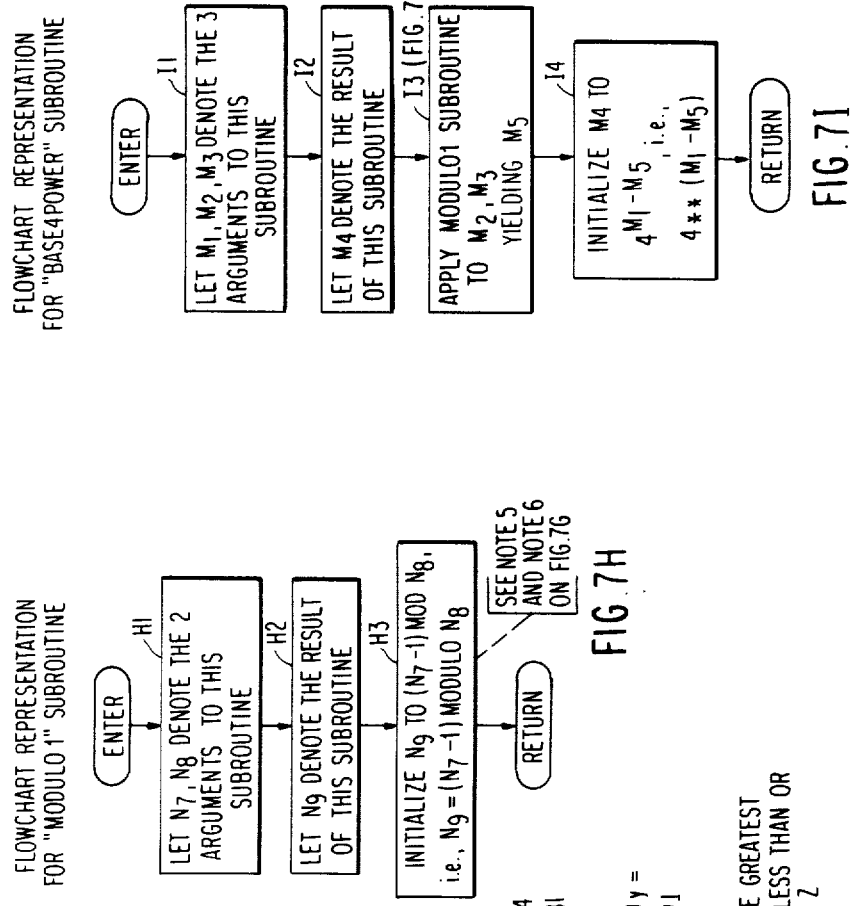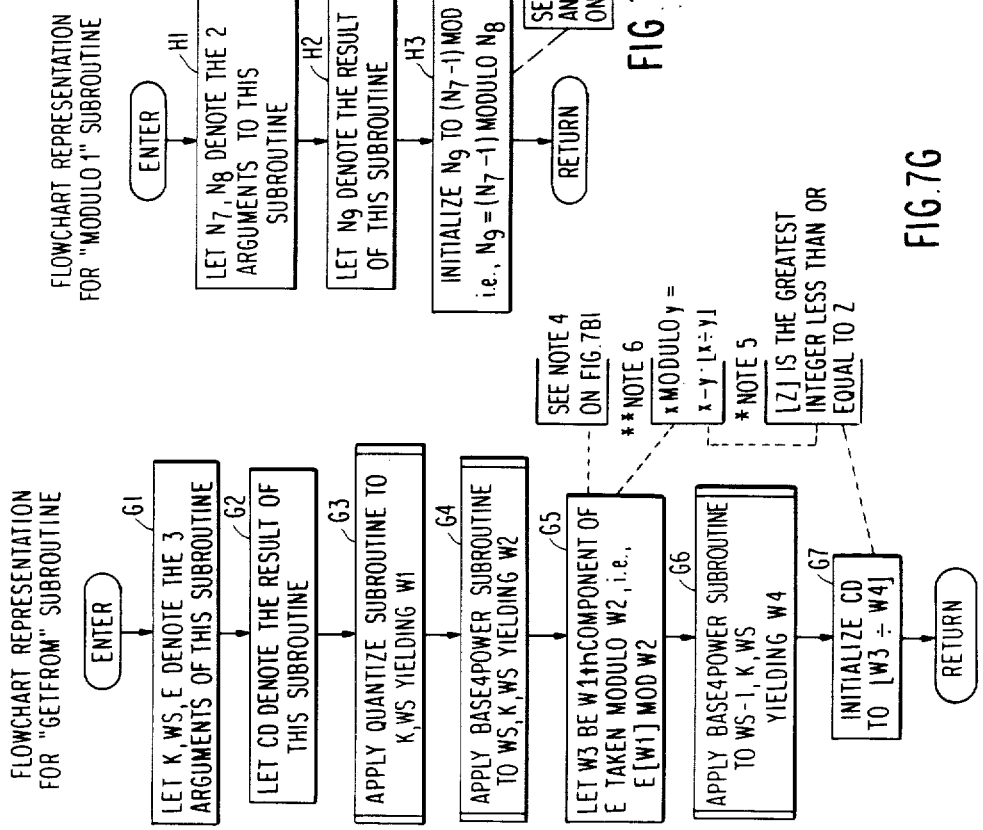

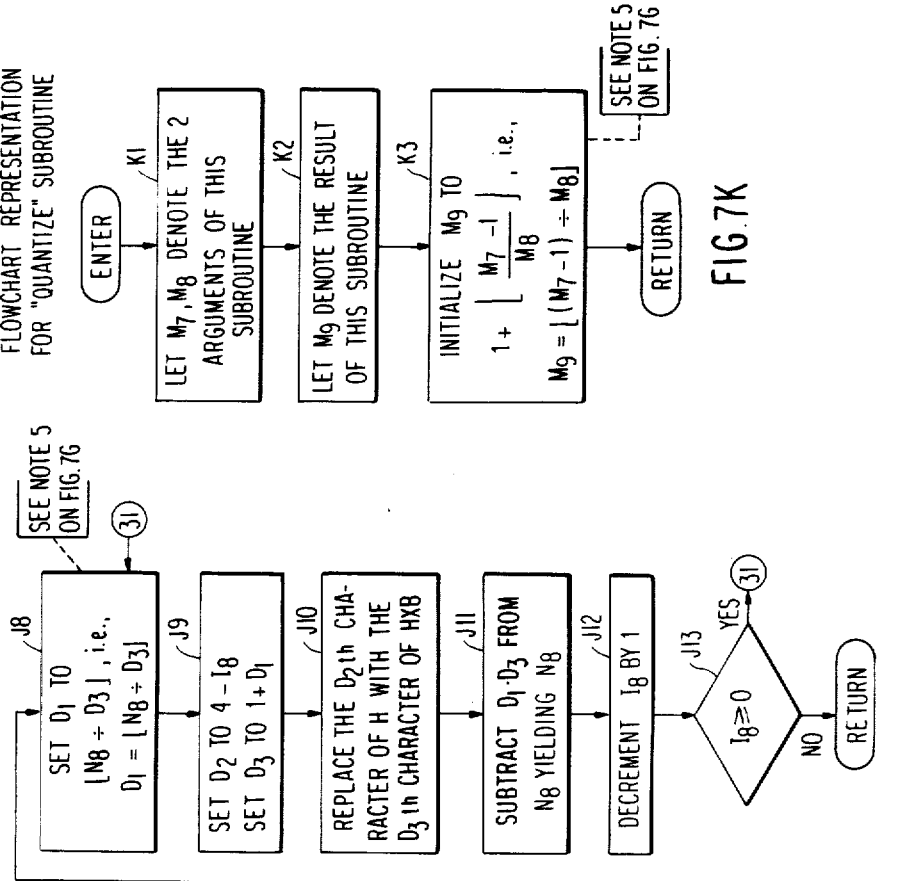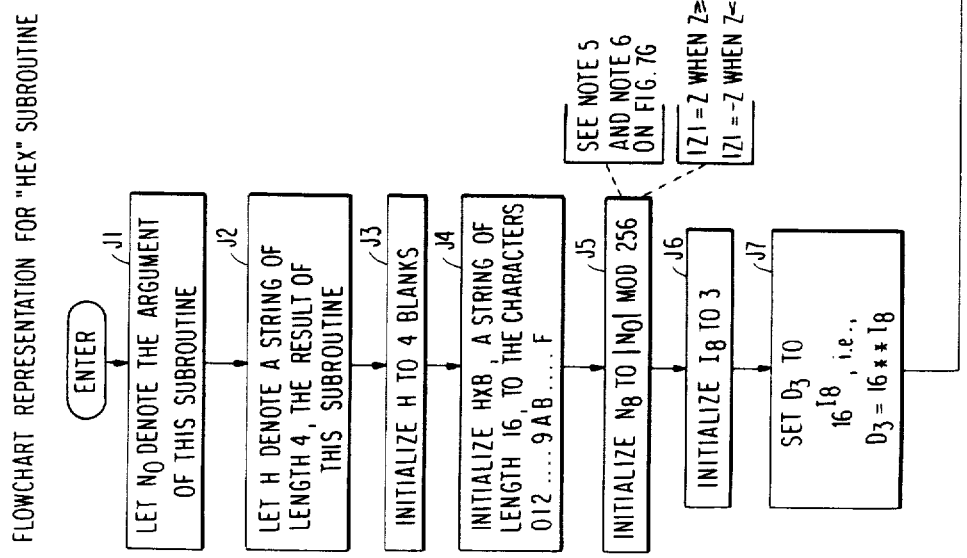

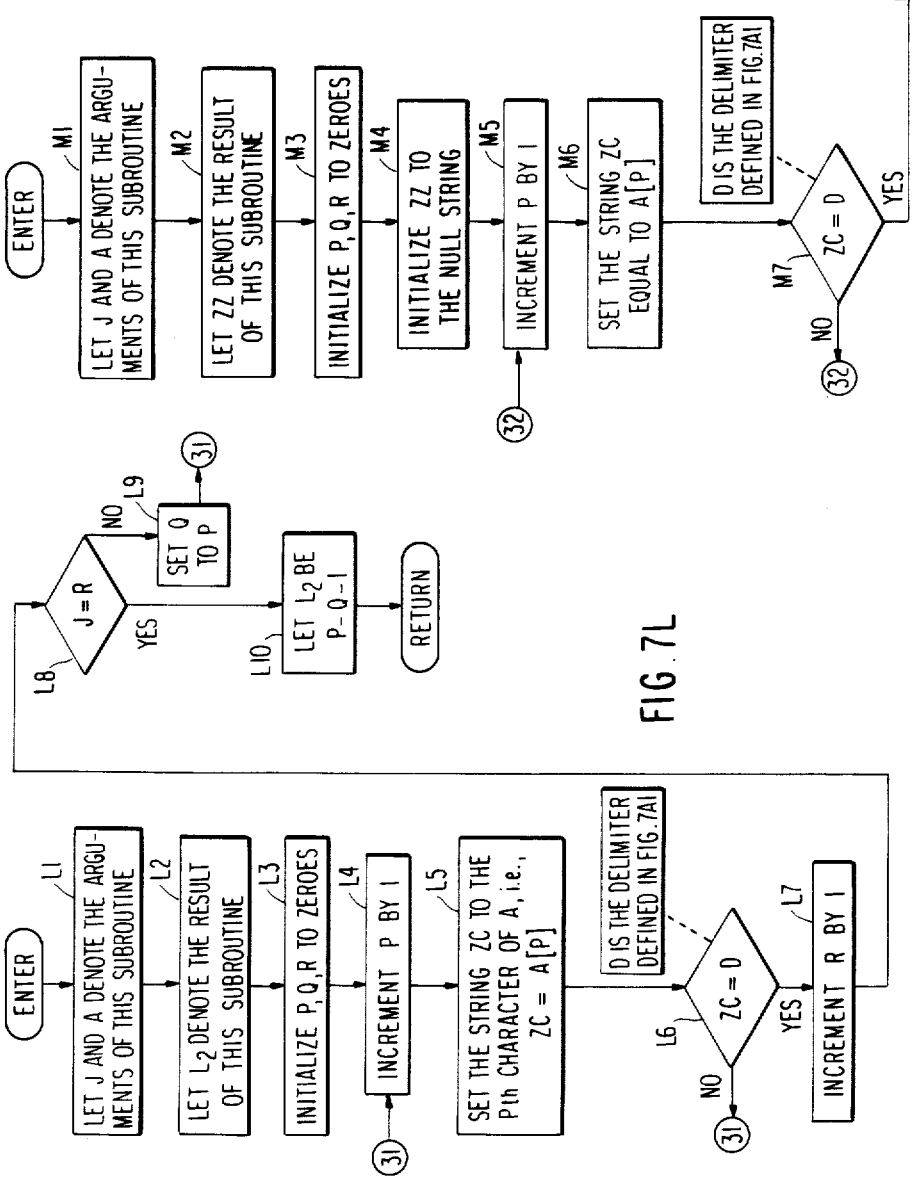

```
INPUT:
( (A B) (C D (E)) (F (G)) H I ( ) (J))
NUMBEROFSTEPS=    36;
ENCODED TREE:
ENCODED(1)=    44486    HEXREPRESENTATION='ADC6';
 1ST STEP IS 2
 2ND STEP IS 2
 3RD STEP IS 3
 4TH STEP IS 1
 5TH STEP IS 3
 6TH STEP IS 0
 7TH STEP IS 1
 8TH STEP IS 2
ENCODED(2)=    56752    HEXREPRESENTATION='DCB0';
 9TH STEP IS 3
10TH STEP IS 1
11TH STEP IS 3
12TH STEP IS 1
13TH STEP IS 2
14TH STEP IS 3
15TH STEP IS 0
16TH STEP IS 0
ENCODED(3)=    28080    HEXREPRESENTATION='6DB0';
17TH STEP IS 1
18TH STEP IS 1
19TH STEP IS 3
20TH STEP IS 1
21ST STEP IS 2
22ND STEP IS 3
23RD STEP IS 0
24TH STEP IS 0
ENCODED(4)=    30561    HEXREPRESENTATION='7761';
25TH STEP IS 1
26TH STEP IS 3
27TH STEP IS 1
28TH STEP IS 3
29TH STEP IS 1
30TH STEP IS 2
31ST STEP IS 0
32ND STEP IS 1
ENCODED(5)=    45056    HEXREPRESENTATION='B000';
33RD STEP IS 2
34TH STEP IS 3
35TH STEP IS 0
36TH STEP IS 0
ATOMS EXTRACTED ARE:
A,B,C,D,E,F,G,H,I,J

OUTPUT:
((A B) (C C (E)) (F (G)) H I () (J))
DONE
00000
10/17/79 14:03
P: T=3.40/1.34  14:03:34
CHC EXTRA
GIVE TARGET OF PP OUTPUT PRINTER OR TERMINAL
TERMINAL
DISK 'B' NOT ACCESSED.
DISK 'R' NOT ACCESSED.
10/17/79 14:03

YET ANOTHER REPRESENTATION FOR ACYCLIC LIST STRUCTURE    791017    140421000

INPUT:
((FUZZ (WAS (UPON (A ROCK)) GATHERED)) G0003)
NUMBEROFSTEPS=    23;
ENCODED TREE:
ENCODED(1)=    44470    HEXREPRESENTATION='AD86';
 1ST STEP IS 2
 2ND STEP IS 2
 3RD STEP IS 3
 4TH STEP IS 1
 5TH STEP IS 2
 6TH STEP IS 3
 7TH STEP IS 1
 8TH STEP IS 2
```

FIG.8.  SAMPLE RUNS OF THE FIG.7 PROGRAM – PART A.

```
ENCODED(2)=    56176    HEXREPRESENTATION='D870';
 9TH STEP IS 3
10TH STEP IS 1
11TH STEP IS 3
12TH STEP IS 3
13TH STEP IS 3
14TH STEP IS 3
15TH STEP IS 0
16TH STEP IS 0

ENCODED(3)=    28784    HEXREPRESENTATION='7070';
17TH STEP IS 1
18TH STEP IS 3
19TH STEP IS 0
20TH STEP IS 0
21ST STEP IS 1
22ND STEP IS 3
23RD STEP IS 0

ATOMS EXTRACTED ARE:
FUZZ,WAS,UPON,A,ROCK,GATHERED,G0003

OUTPUT:
((FUZZ (WAS (UPON (A ROCK)) GATHERED)) G0003)
DONE
 6000n

T07T 7/79 14:34
A; T=0.46/1.30 14:04:33
CHC INTA
GIVE TARGET OF PP OUTPUT PRINTER OR TERMINAL
TERMINAL
DISK 'B' NOT ACCESSED.
DISK 'B' NOT ACCESSED.
10/17/79 14:04

YET ANOTHER REPRESENTATION FOR ACYLIC LIST STRUCTURE         791017    140514000

INPUT:
 ((ITERDP X) NIL) ((LESSP 0 N) (APPEND (IOTA (SUB1 N)) (LIST N))) ((GREATERP 0 N)
 (ERROR "BAD "ARGUMENT N "TO "-IOTA-)) ) )
NUMBEROFSTEPS=      66;
ENCODED TP(E;
ENCODED(1)=    44487    HEXREPRESENTATION='ADC7';
1ST STEP IS 2
2ND STEP IS 2
3RD STEP IS 3
4TH STEP IS 1
5TH STEP IS 3
6TH STEP IS 0
7TH STEP IS 1
8TH STEP IS 3

ENCODED(2)=    6877     HEXREPRESENTATION='1ADD';
 9TH STEP IS 0
10TH STEP IS 1
11TH STEP IS 2
12TH STEP IS 3
13TH STEP IS 3
14TH STEP IS 1
15TH STEP IS 3
16TH STEP IS 1

ENCODED(3)=    50907    HEXREPRESENTATION='C6D8';
17TH STEP IS 3
18TH STEP IS 0
19TH STEP IS 1
20TH STEP IS 2
21ST STEP IS 3
22ND STEP IS 1
23RD STEP IS 3
24TH STEP IS 3

ENCODED(4)=    28097    HEXREPRESENTATION='6DC1';
25TH STEP IS 1
26TH STEP IS 2
27TH STEP IS 3
28TH STEP IS 1
29TH STEP IS 3
30TH STEP IS 0
31ST STEP IS 0
32ND STEP IS 1

ENCODED(5)=    46849    HEXREPRESENTATION='B701';
33RD STEP IS 2
34TH STEP IS 2
35TH STEP IS 1
36TH STEP IS 3
37TH STEP IS 3
38TH STEP IS 2
39TH STEP IS 0
40TH STEP IS 1

ENCODED(6)=    44508    HEXREPRESENTATION='ADDC';
41ST STEP IS 2
42ND STEP IS 2
43RD STEP IS 3
44TH STEP IS 1
45TH STEP IS 1
46TH STEP IS 1
47TH STEP IS 3
48TH STEP IS 0
```

FIG.8. SAMPLE RUNS OF THE FIG.7 PROGRAM _ PART B

```
ENCODED(7)= 28125    HEXREPRESENTATION='6DDD';
49TH STEP IS 1
50TH STEP IS 2
51ST STEP IS 3
52ND STEP IS 1
53RD STEP IS 3
54TH STEP IS 1
55TH STEP IS 3
56TH STEP IS 1

ENCODED(8)= 56768    HEXREPRESENTATION='DDCD';
57TH STEP IS 1
58TH STEP IS 1
59TH STEP IS 3
60TH STEP IS 1
61ST STEP IS 3
62ND STEP IS 0
63RD STEP IS 0
64TH STEP IS 0

ENCODED(9)= 0        HEXREPRESENTATION='0000';
65TH STEP IS 0
66TH STEP IS 0

ATOMS EXTRACTED ARE:
ZEROP.N.NIL.LESSP.O.N.APPEND.IOTA.SUB1.N.LIST.N.GREATERP.O.N.ERROR."BAD."ARGUMENT.N."TO."-IOTA-

OUTPUT:
((ZEROP N) NIL) ((LESSP O N) (APPEND (IOTA (SUB1 N)) (LIST N)))
((GREATERP O N) (ERROR "BAD "ARGUMENT.N."TO "-IOTA-))))
DONE
00000
10/17/79 14:05
R; T=0.60/1.72 14:05:37
HARDCOPY STOP
```

FIG. 8. SAMPLE RUNS OF THE FIG.7 PROGRAM — PART C.

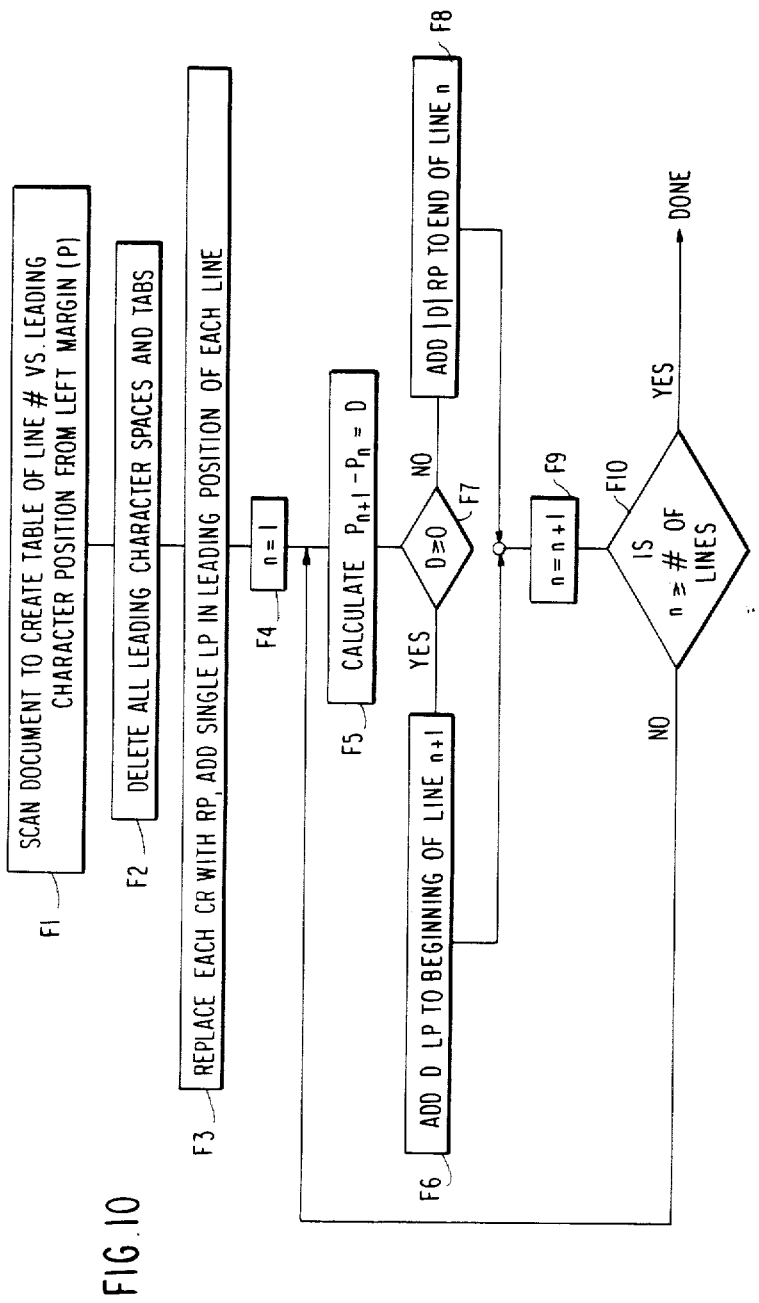

METHOD FOR ENCODING AND DECODING ACYCLIC, LINKED-LIST DATA STRUCTURES FOR EFFICIENT STORAGE, RETRIEVAL AND SEARCHING

DESCRIPTION

1. Technical Field

The present invention relates to a method of encoding or transforming hierarchically arranged data such as an acyclic, linked-list for efficient storage and retrieval.

2. Background Art

Scalars, character strings, vectors, arrays, generalized arrays, PL/1 structures, Pascal and ADA$_{TM}$ records, symbol tables, trees and forests can all be represented as acyclic lists. The acyclic list was introduced by Newell and Simon as part of the list processing language IPL-IV and by John McCarthy in 1961 as the primary data type of his programming language LISP. The acyclic list is one of the most general data structures known, because it is a technical representation for the ubiquitous hierarchy.

Originally, lists were used exclusively for list processing with one of the list processing program languages (such as LISP). Today lists are used in artificial intelligence, linguistics, computer-based medical diagnosis and information retrieval, computer-based representation of chemical structures, algebraic manipulation, natural language understanding, vision research and as the format for compiler intermediate languages (e.g. TCOL$_{ADA}$)

One of the handiest features of acyclic lists or a hierarchy from a practical standpoint is their amenability to being represented in different ways, both on paper and with computers. Each of these representations has its advantages and disadvantages and no one representation dominates the others. Two of the common representations for acyclic lists, are singly linked lists and doubly linked lists. These are described by Knuth in *The Art of Computer Programming*, Vol. 1, "Fundamental Algorithms", 2nd ed, (Addison-Wellsley) at pages 408 et seq. A specific arrangement for encoding linked list data is described by Lyman et al in U.S. Pat. No. 4,047,248, and a machine for processing acyclic lists is described by Misunas et al in U.S. Pat. No. 4,149,240. Werner Patent U.S. Pat. No. 3,737,864 describes the storage of a ALGOL program with different lexicographical levels (such as an indented list) and describes the use of pointers which indicate, by their contents, the beginning and ending of different lexicographical levels. This is another example of a linked list.

Acyclic lists (or hierarchies) are often dynamic structures. They must be altered to meet the needs of a developing problem's solution. This alteration includes deletion or addition of components. The deletion of a component in the middle of a singly linked list requires traversal of the list sequence prior to the component to be deleted in order to preserve link integrity. Doubly linked lists eliminate the necessity for this list traversal, but the price exacted for this advantage is an additional memory unit per list component.

The basic difficulty with typical representations is that of memory inefficiency. The information necessary to describe the connectivity of a list component or the relationship of a hierarchy element to other elements can occupy as many as two or three memory units depending on the density of the linkage and the manner in which the links are packed within the memory of a digital computer. See G. L. Steele "Data Representation in PDP-10 MACLISP", MIT A. I. Memo No. 420, NTIS Report AD-A052-305, April 1978.

Bobrow in "A Note on Hash Linking", *Communications of the ACM*, Vol. 18, pages 413–415, July 1975 and Bobrow et al in "Compact Encodings of List Structure", *ACM Transactions on Program Language and Systems*, Vol. 1, No. 2, pages 266–286, October 1979 suggest several ways to provide for more efficient memory usage for representing list structures. Even these compact encodings of list structure expend a memory unit solely for the linkage of an item, an expenditure which may be prohibitive for some applications. Representations of acyclic lists which pack link information (spatial information) in units smaller than a computer memory unit do suffer inherent inefficiencies for packing and unpacking this information, at least when used on computers lacking rich partial word operations. The invention is predicated on my assumption that such costs are negligible for a particular application or alternatively are outweighed by savings in the memory effected by such packing.

SUMMARY OF THE INVENTION

In order to improve memory efficiency, and attain several other benefits outlined below, I choose to separate the spatial representation of an acyclic list or other hierarchy from the scalar, "atomic" or string items and the order of their appearance. More particularly, an acyclic list can be considered a form of hierarchical information which in a human readable format contains two types of information, "atoms" and the spatial relationship of the atoms. Atoms are defined as contiguous strings of alphanumeric characters or similar symbols. For my purposes, in order to preserve the information in an acyclic linked list, through its transformation in accordance with my invention and retransformation back to its original form, I choose to prohibit from inclusion in an "atom" a blank (or empty) character. It is well known that a distinction is sometimes made between a blank or space character and a null or empty character location. In the context of my invention I treat these in a similar fashion. Hereinafter blank (or space) and null (or empty) characters may be referred to either as blank, space, null or empty. Thus in accordance with my invention an "atom" consisting of two strings separated by one or more blanks, is considered two strings, separated by one or more blank character(s). This prohibition is customary with list processing prior art and is applicable to any text sequence. However, this choice is optional, as will be described.

The other type of information contained in an acyclic linked list or hierarchy is the spatial information. In human readable form the spatial information in such a list is implicit in the location of the atoms relative to each other, in other words there are no alpha-numeric or other symbols explicitly containing spatial information.

In accordance with a first step of a particular method in accordance with the invention, I choose to modify the acyclic linked list or hierarchy by adding to it explicit spatial information and place-holding information. The added information uses four different symbols and I choose these symbols so that they are used to uniquely represent the added information. The use of four symbols enables each to be coded as two binary bits, and as we will see later, this is an advantage.

Two of these four symbols are devoted to spatial information, as will be described below, a third symbol is a place-holder representing a contiguous (non-blank including) string of alpha-numeric characters, and the fourth symbol is another place-holder used to represent the location of one or more locations which are blank or devoid of characters.

A first spatial information representing symbol for convenience hereinafter represented as (LP) denotes a unit indentation (unit step to the right). By concatenating several adjacent such step (LP) symbols any number of right steps can be represented. A second spatial information representing symbol for convenience hereinafter RP) identifies a line ending, and in some cases several RP symbols are used to adjust the initial location for the succeeding line. Since all locations are relative, by use of the unit indentation (right step) and new line symbols, complete generality for representing spatial information is retained. Two place-holding symbols (for convenience hereinafter P1 and P2) are used for place-holding an atom (P1) and place-holding a string of one or more blanks or locations devoid of characters (P2).

The first step of the method then is to scan hierarchical information and to annotate it by adding the two spatial information representing symbols in a position and location within the acyclic linked lists, so that the resulting hierarchical information explicitly represents the spatial information in the list.

The next step in the method is to scan the annotated hierarchical information to yield two byproducts, both of which are strings.

A first byproduct is merely a sequence of the added information symbols and place holding symbols constructed as follows. Begin at the beginning of the annotated hierarchical information and scan that information in sequence, the first byproduct includes RP for each RP in the scanned information, LP for each LP in the scanned information, a single P1 for each contiguous alpha-numeric string and a single P2 in lieu of each contiguous string of one or more blank characters or empty locations. Thus the first byproduct is merely a sequence of the added information symbols (RP, LP, P1 and P2), whose number and sequence represent the spatial information in the hierarchical information and, as will be described, allow the first byproduct to be used in connection with the atoms to reconstruct the hierarchical information without loss of spatial information.

The second byproduct is merely a concatenation of the strings appearing in the annotated hierarchical information, separated by string delimiters and in the order in which the strings appear in the list. Thus when the first alpha-numeric string is encountered (not containing a blank or a location devoid of characters) in an annotated hierarchical information, and the third symbol (P1) is placed in the first byproduct to represent that alpha-numeric string, the alphanumeric string itself is placed into the second byproduct, and terminated by a string delimiter (for example a comma). When the annotated hierarchical information has been completely scanned, the second byproduct is thus a concatenation of the strings located in the hierarchical information. Notice that the second byproduct contains no blanks or locations devoid of characters. In some environments (PL/1) the second byproduct can consist of an array of atoms, in this context the string delimiter is implicit. In other environments an explicit string delimiter is used, such as the comma.

The two byproducts can now be stored. My claim is that together, the pair of byproducts are entirely equivalent to the original hierarchical information. Moreover, storage for the second byproduct requires no more storage space (plus perhaps a storage unit for each delimiter) than required for the alphanumerics in the original hierarchical information. The penalty paid for including spatial information in machine readable form is the cost of storing the first byproduct. This cost is minimized by encoding each of the four symbols appearing in the first byproduct as a different 2-bit binary combination. As a result, each sequence of four symbol-representing bit combinations can be stored in a single byte (8 bits). In general for a computer word of w bits, w/2 symbols can be stored in each word.

This method can be practiced by properly programming a computer. The hierarchical information can be annotated by hand, and then the annotated hierarchical information stored in the computer. The computer, once it has access to the annotated hierarchical information, can then scan the annotated hierarchical information to produce to the first and second byproduct strings and store the same.

Alternatively, and in the usual case, the hierarchical information itself can be stored if it is available in machine readable form, and the computer itself can be programmed to annotate the stored hierarchical information to produce the annotated hierarchical information needed to produce the two byproducts. For example word processing programs typically store data definitive of a formatted alpha-numeric document which explicitly identifies spatial information. More particularly, each line ending is identified by a unique symbol (carriage return), likewise right indents are identified by either leading character spaces (blanks), tabs or the like. For hierarchical information stored in such a format, a computer operating under an appropriate program can scan the stored information, delete the formatting symbols (carriage returns, tabs, etc.) and add the necessary spatial representing symbols as required to produce the annotated hierarchical information.

Thus, in accordance with one embodiment the invention provides a method of encoding hierarchical information, which in a human readable form has informational content in both string form as well as in spatial arrangement, to a different format which is characterized by machine-efficient storage, the method comprising the steps of:

(a) storing said hierarchical information in machine readable form, (b) annotating said stored hierarchical information by proceeding through the stored hierarchical information to add explicit spatial information in the form of at least two different spatial characters to produce annotated hierarchical information, (c) scanning said annotated hierarchical information and generating two byproducts to represent said hierarchical information, (c-1) a first byproduct comprising a sequence of a first symbol for each occurrence of a first of said two different spatial characters, a second symbol for each occurrence of a second of said two different spatial characters, a third symbol for every contiguous non-blank containing string in said annotated hierarchical information, and a fourth symbol for every contiguous string of blanks in said annotated hierarchical information, (c-2) a second byproduct comprising a sequence of strings including every contiguous non-blank containing string from said annotated hierarchical information, each contiguous non-blank containing string corresponding to a different occurrence of said third symbol in said first byproduct, and (d) storing the two byproducts produced by steps (c-1) and (c-2).

It should also be apparent that hierarchical information which is encoded in the format just described, besides being efficient in terms of required storage capacity, explicitly stores spatial information separate and apart from string information. Thus, if two sets of hierarchical information have been stored in the format described above, a machine can be programmed to compare the two sets of hierarchical information with each other on the basis of string equality, spatial equality, or overall equality. String equality is determined by merely comparing the two second byproducts, character by character, spatial equality is determined by comparing the first byproducts, symbol by symbol, overall equality is determined by comparing the pairs of first byproducts to each other and then the pairs of second byproducts to each other.

For hierarchical information which includes, as in the typical word processing format, explicit spatial information, the invention provides a method of incorporating spatial information into machine readable hierarchical information to enable said hierarchical information to be efficiently machine searched against target hierarchical information with respect to string equality, spatial equality or overall equality, said method comprising the steps of:

(a) storing said machine readable hierarchical information in a form which explicitly identifies:
  (i) line endings, and
  (ii) a leading blank space between a left margin and an initial alpha-numeric character on a line, (b) scanning said stored hierarchical information to add a pair of spatial characters thereto, one or more of a first spatial character inserted prior to an initial character on a line and one or more of a second spatial character inserted prior to a line ending, said spatial characters explicitly representing spatial information, (c) scanning the result of step (b) to produce a pair of byproducts, a first byproduct comprising a sequence of four distinct symbols, each first symbol representing an instance of said first spatial character, each second symbol representing an instance of said second spatial character, each third symbol representing a different instance of a contiguous alpha-numeric string and a fourth symbol representing each different string of blank or null characters, all in said hierarchical information modified as recited in step (b), and said second byproduct comprising a sequence of the strings of said hierarchical information from step (b) excluding blank or null characters separated by string delimiters, and (d) storing said first and second byproducts.

In some instances there is a desire to determine spatial equality of two different sets of hierarchical information without reference to the position and number of blank characters in the original hierarchical information. To accomplish this result, the invention, in addition to the foregoing steps, modifies the first byproduct by eliminating every fourth symbol. In the alternative the presence of the fourth symbol can be ignored.

Hierarchical information annotated and stored as described above can be used to recreate the original hierarchical information by the following steps: accessing the first byproduct and choosing an output location at which the original hierarchical information will be recreated. Determining the identity of the first symbol in the first byproduct, and in dependence on that symbol, at the output location either:

writing a first spatial representing character and advancing to the next position at both said output location and in said first byproduct, writing a second spatial representing character and advancing to the next position at both said output location and said first byproduct, accessing said second byproduct to reproduce a next string stored therein and advancing to the next empty position at the output location and advancing to a next symbol in both said first and second byproducts, writing a blank and advancing to the next position at the output location and in the first byproduct.

Once the first symbol in the first byproduct has been treated as described above, advance through the first byproduct to determine the identity of the next symbol and repeat the preceding step until all symbols of the first byproduct are exhausted. At the conclusion of the process, the output location will include the annotated hierarchical information. In this form then we can use the first and second spatial characters interspersed at the output location to spatially align information at the output location to thus recreate the original hierarchical information. By "spatially align", I mean either inserting tabs, carriage returns, etc. or producing a hard copy by the appropriate use of spaces, tabs and carriage returns. If desired, the first and second spatial characters in the annotated hierarchical information can be deleted as they are no longer required.

BRIEF DESCRIPTION OF THE DRAWINGS

The present invention will now be further described in the following portions of this specification when taken in conjunction with the attached drawings wherein:

FIGS. 1A and 1B illustrate two different representations of typical hierarchical information which can be processed in accordance with the invention;

FIGS. 2–4 illustrate intermediate stages in the processing wherein the hierarchical information is transformed into annotated hierarchical information in accordance with the present invention;

FIGS. 5A and 5B illustrate the encoded versions of the hierarchical information and the manner in which they are machine stored in accordance with the invention;

FIGS. 6A–6G inclusive illustrate still other forms of hierarchical information and the manner in which that information is processed and stored in accordance with the invention;

FIGS. 7A1–7A3, 7B1–7B2, 7C1–7C2 and 7D–7M comprise a flow chart illustrating the manner in which annotated hierarchical information can be encoded and stored in accordance with the invention and, from the encoded and stored information how the original hierarchical information can be recreated;

FIG. 8, parts A–C, inclusive illustrate the results of processing the routine of FIG. 7;

FIG. 9 is a schematic representation of memory content storing text information in accordance with conventional word processing programs which is useful in a description of an embodiment of the invention;

FIG. 10 is an algorithm or flow chart showing how text information in the form of FIG. 9 can be transformed into the annotated hierarchical information which may be thereafter processed in accordance with the invention as already described.

DETAILED DESCRIPTION OF PREFERRED EMBODIMENTS

Figure 1B:
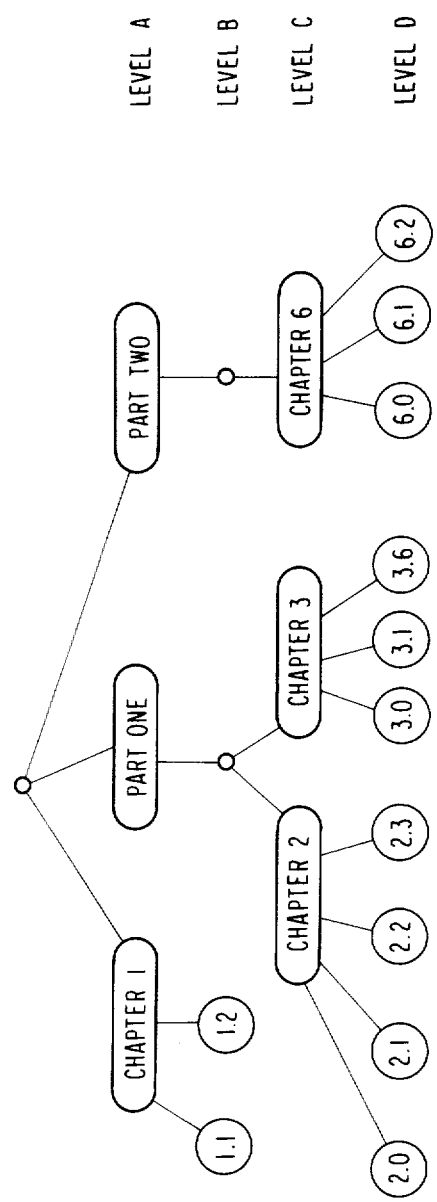

As indicated above, the invention provides a method for encoding or transforming data structures or information patterns which are commonly called hierarchies to a form in which they can be efficiently stored in a machine. The particular format into which the information is encoded is necessarily, machine readable; it is also reversible so that the original data structure or information pattern can be reproduced: the format is also efficient from the memory usage point of view, and capable of efficient comparison and general searching.

In order to describe the invention, we will use a hierarchy which is typical in word processing and corresponds to the table of contents shown in FIG. 1A.

Referring now to FIG. 1A, a typical table of contents has been illustrated which has three major parts. (The Roman characters are added for reference purposes; they are not part of the data per se.) A first part has only one subpart, chapter 1. A second part (labelled "Part One") has two subparts: chapters 2 and 3. Part 3 (labelled "Part Two") also has a single subpart, chapter 6. In the example of FIG. 1A, each of the subparts (chapters 1, 2, 3 and 6) have further divisions, chapter 1 has sections 1.0, 1.1 and 1.2, and similarly chapters 2, 3 and 6 also have sections.

We can consider that the information in FIG. 1A includes four different levels of indentation, the lowest level IV is identified at the section level (except for sections 1.0 etc.), the next higher level III is chapters 2 and 3, the next higher level II is the chapter 6 and the sections 1.0, etc.), and the highest level I is chapter 1 and Parts One and Two.

The major components of the Table of Contents in FIG. 1A can be restated in tree form of FIG. 1B. The representation of FIG. 1B shows that Chapter 1, Part One and Part Two occupy a common level in the tree, and Chapters 2 and 3 occupy a different but also common level, and finally Chapter 6 occupies a unique level closer to the root than Chapters 2 and 3. The manner of choosing the various levels is unimportant, what is important is that the spatial information represented in FIG. 1A can be encoded and stored efficiently, used in encoded form for some purposes and the original information can be recreated, proving that the efficient encoding has captured all essential original information.

Accordingly, in order to correctly spatially represent the hierarchical information of FIG. 1A or FIG. 1B, we must not only represent the string information, but we must also identify the indentation level at which each different string begins. FIG. 2 shows the hierarchical information of FIG. 1A annotated to more explicitly reveal the spatial information. The physical indentation of FIG. 2 is not germane, it is actually added to make the association with the original contents easy to see. FIG. 2 differs from FIG. 1A (aside from the indentation) in the addition of two different spatial representing characters, the first character is a "(" (representing LP), and the second character is a ")" (representing RP). The physical format of these two characters are immaterial, the positional information they represent is significant.

Since the indentation of FIG. 2 is really for the reader's convenience, FIG. 3 is a reproduction of FIG. 2 with the indentation omitted. As we will now show, FIG. 3 actually includes the spatial information of FIGS. 1 and 2, in explicit format, as compared to FIG. 1 in which the spatial information is only implicit. In order to do this, we have reproduced in FIG. 4 the representation of FIG. 3 with the addition of several superscript characters (1–6). The superscript characters represent the sum of the prior spatial representing characters (left parentheses and right parentheses) where we give each left parenthesis a value +1, and each right parenthesis a value of −1. The superscript characters are for the reader's convenience only, they play no part in the data which is stored, or recreated.

Accordingly, as shown in FIG. 4, our text string in the first line begins at the physical location +3 from a reference location. Because of the presence of the right parenthesis (to indicate the line ending of the first line), as well as the two left parentheses leading line 2, line 2 begins at a position +4 from some reference position. The same is true for lines 3 and 4. However, the three right parentheses at the end of line 4, taken together with the two left parentheses at the beginning of line 5 means that the first character on line 5 begins at a position +3 from the reference, the same position as the first line. In a similar fashion, the reader can determine that the spatial information contained in FIG. 1A is shown explicitly with the use of our spatial characters, left parentheses and right parentheses.

The format of FIG. 4 is only an intermediate step in the method. Once we have attained this intermediate format, which is referred to as annotated hierarchical information, we then encode the position information by scanning the annotated hierarchical information from top left to bottom right according to the following rules:

Rule 1: For every left parenthesis, write an arbitrary 2' (we use the ' to indicate that this particular symbol is not the same as the alpha-numeric symbol 2) in a first byproduct.

Rule 2: For every right parenthesis, write the symbol 0' (for the same reason) in the first byproduct.

Rule 3: For every contiguous string of non-blank characters not containing a parenthesis, write a 3' in the same byproduct.

Rule 4: For every contiguous string of one or more blanks or null appearing between two contiguous strings of non-blank characters not containing a parenthesis, write the digit 1' in the same byproduct.

By proceeding through the annotated hierarchical information of FIG. 4 using the four rules above, we can generate a first byproduct (see FIG. 5A). More on this first byproduct will be described below.

At the same time we are proceeding through the annotated hierarchical information to write the first byproduct, every time we encounter a string of non-blank characters not containing a parenthesis (an atom), we take that string and add it to a string of "atoms" delimited by some substring terminator, for example a comma. This is effected to produce a second byproduct.

The result of performing these operations will produce the byproducts of FIGS. 5A and 5B. More particularly, FIG. 5A shows the first byproduct and FIG. 5B shows the second byproduct. In FIG. 5A, the primes have been omitted and the commas added merely for convenience. Because our first byproduct is composed of a sequence of four different symbols, we can encode each symbol in two bits. Accordingly, the 273 integers comprising the first byproduct of FIG. 5A can be stored in 69 bytes (actually 68.25). We now illustrate that the process is reversible, e.g. from the two byproducts of FIGS. 5A and 5B we can retrieve the original hierarchical information of FIG. 1A. To do this we first access the first byproduct, beginning with the first symbol (the bit pair) and access the first substring of the second byproduct and follow the rules specified below:

Rule 1: If the next digit in the first byproduct is a 2', write a left parenthesis, and advance to the next digit (bit pair).

Rule 2: If the next digit is a 0', write a right parenthesis and unless the sequence of digits is exhausted, advance to the next digit. In some cases (including the example being described), a 0' or the first 0' in a string of 0's also represents a carriage return and line feed. If the sequence of digits is exhausted, we are finished and so stop.

Rule 3: If the next digit is a 3', take the next atom (substring) from the second byproduct, write it and advance to the next atom in the second byproduct and advance to the next digit in the first byproduct.

Rule 4: If the next digit is a 1', write a single blank and advance to the next digit.

The only difference between the reproduced hierarchical information and that shown in FIG. 1A is that the number of adjacent blanks in any string of blanks is not preserved. If it is desired to retain the number of adjacent blanks in every string of blanks, we merely consider a blank as any other alpha-numeric character so it is included in any string in which it is found. Other ways to handle this problem will be apparent.

Over and above the advantage in memory efficiency obtained by using the invention, there is an additional advantage in searching, e.g. comparing a target hierarchical set of information with a stored set of hierarchical information, stored in accordance with the invention. This advantage obtains by the ability to compare the shape of the target set with the shape of the stored set, and this comparison can be effected without even decoding. Thus it is only necessary to compare bit by bit or digit by digit or symbol by symbol the first byproduct of two sets of hierarchical information.

The same advantage is found if the user desires to determine the differences between a target set of hierarchical information and one or more stored sets of hierarchical information. Shape differences can obviously be determined by merely comparing first byproducts, content differences can be compared by comparing the second byproducts.

Figures 6A, 6B:
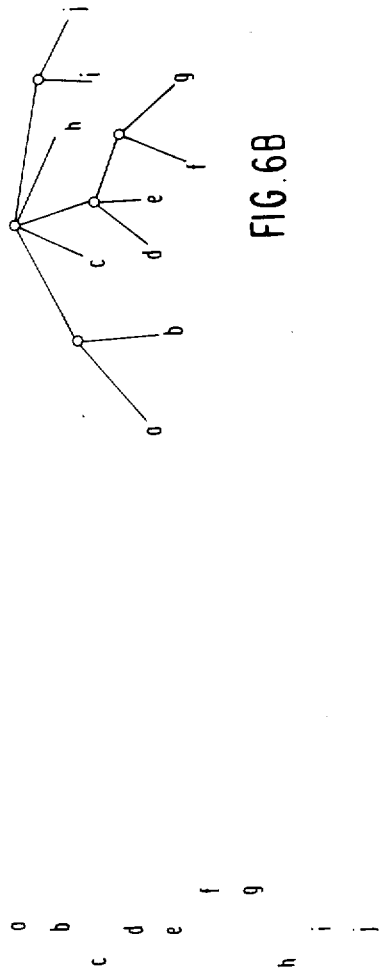

As another example, FIG. 6A shows another example of hierarchical information using the letters a–j to represent different alpha-numeric strings (or atoms). Thus, in FIG. 6A the hierarchical information includes, in addition to the alpha-numerics (represented by the characters a–j) the spatial information including the line endings and the distance between the left margin of FIG. 6A and the horizontal position of each of the alpha-numeric characters. The hierarchical information of FIG. 6A can also be represented by the tree of FIG. 6B. The hierarchical information (both alpha-numeric and spatial) can be represented in annotated hierarchical form, in accordance with the invention as shown in FIG. 6C. In FIG. 6C the "(" represents a unit right indentation, the ")" or the first such ")" in a sequence of ")" represents a line ending and simultaneously a unit space left movement. Each subsequent ")" in a sequence merely represents a left shift in the next line. Thus the annotated hierarchical information of FIG. 6C has the "(" and ")" annotations added to the purely alpha-numeric information (characters a–j). In accordance with the invention the annotated hierarchical information shown in FIG. 6C can then be processed to produce the first byproduct (FIG. 6D) and the second byproduct (FIG. 6E). Thus, in accordance with the previously stated rules, each "(" is represented in the first byproduct by the symbol "2", each alpha-numeric string is represented by the symbol "3", and each ")" is represented by the symbol "0". The second byproduct, of course, merely includes a sequence of the alpha-numeric characters (a–j), each terminated with a string terminator such as the comma.

FIG. 6F is a different representation of the tree of FIG. 6B. In FIG. 6F the illustration shows in addition to the annotation information and the alpha-numeric characters themselves, short horizontal dashes which have been added to FIG. 6F merely to indicate the location of blank or empty character spaces. The representation in FIG. 6F is different from FIG. 6C in that for example, alpha-numeric characters A and B are indicated as lying on a common level as well as on a common line. Thus the annotated versions of the FIG. 6B tree is different in FIGS. 6C and 6F. In accordance with the invention, when the annotated hierarchical information of FIG. 6F is scanned to generate the first byproduct, the result is shown in FIG. 6G. The second byproduct is, of course, identical to FIG. 6E.

FIGS. 7A1–7A3, 7B1–7B2, 7C1–7C2 and 7D–7K show a flowchart. The processing shown on the flowchart will take annotated hierarchical information, convert and store it in accordance with the invention, and access the stored information to recreate the original annotated hierarchical information. FIG. 8, parts A, B and C, illustrate three sample runs of the flowchart of FIG. 7, parts A-K, operating first on the input information:

((A B)(C D (E))(F (G)) H I ( )(J)).

In this first run there are as shown 36 steps and the first byproduct is:

223130121312300123123001313120012300, and the second byproduct is:

A, B, C, D, E, F, G, H, I, J.

Directly below the listing of "atoms extracted" the run shows the first and second byproducts being converted, by the flowchart of FIG. 7, back to the original input.

The next run shows operation on the input:

((Fuzz (was (upon (a rock)) gathered)) G0003).

The first byproduct of this annotated hierarchical information is:

22312312312313001300130, and directly below this (FIG. 8, part B), the atoms extracted are identified, and directly below the atoms extracted, the output shows that the annotated hierarchical information as reconstructed is identical to the input.

FIG. 8, part B also shows a third run illustrating the first byproduct in a similar fashion to that which it has illustrated in the previous two runs, and following that, the atoms extracted and a reproduction of the output showing it as identical to the input.

The flow chart of FIG. 7 is broken down into the principal program part (FIGS. 7A1–7A3), as well as the subroutines CANONIC (FIGS. 7B1-7B2), ETREE (FIGS. 7C1-7C2), ADDCHAR (FIG. 7D), ADDTO (FIG. 7E), DTREE (FIG. 7F), GETFROM (FIG. 7G), MODULO1 (FIG. 7H), BASE4POWER (FIG. 7I), HEX (FIG. 7J), QUANTIZE (FIG. 7K), FINDL (FIG. 7L) and FINDA (FIG. 7M). In the principal program part (FIGS. 7A1-7A3) steps A1-A9 are preparatory steps. Thereafter, the input, annotated hierarchical information is manipulated by CANONIC to "normalize" the annotated hierarchical information in a manner to be explained hereinafter. Step A12 actually encodes the annotated hierarchical information in accordance with the invention. Step A15 is used in combination with steps A16-A35 to transfer (to storage or another device) the annotated hierarchical information which has been encoded in accordance with the invention. Step A37 decodes the encoded annotated hierarchical information so as to recreate, at step A38, the originally input annotated hierarchical information.

The CANONIC subroutine locates pairs of blank or empty locations and eliminates one of each pair. Accordingly, the annotated hierarchical information ($I_o$) which is input, produces a result in which the length of any sequence of blank or null characters has been reduced to unity.

The subroutine CANONIC also examines and eliminates blank or null character locations which are adjacent to the RP or LP characters. Thus CANONIC is used to "normalize" the annotated hierarchical information by eliminating redundant or unnecessary blank or empty character locations. While this simplifies subsequent processing, it is not essential to the invention.

The subroutine ETREE (FIGS. 7C and 7C2) accepts the normalized annotated hierarchical information and encodes it in accordance with the invention. This subroutine, at appropriate locations refers to the subroutine ADDTO. As will be described, each time ADDTO is executed, another symbol is added to the first byproduct. ETREE also, at appropriate locations, calls ADDCHAR; each time ADDCHAR is called another atom is added to the second byproduct.

Referring now to FIG. 7A1, it should be apparent that steps A1-A7 are preparatory in nature, defining variables, and allocating memory space. Step A8 accepts the annotated hierarchical information ($I_0$). Step A9 merely sets a variable L defining the length of the string $I_0$. The output of step A8 is run through CANONIC, also for the purposes mentioned. Step A12 is the execution of ETREE, and the product is NS (the number of symbols in the first byproduct), E (the first byproduct), NA (the number of atoms in the second byproduct), and A (the second byproduct). Before proceeding further, reference is made to FIG. 7B to illustrate the running of CANONIC.

The steps B1-B3 are clearly preparatory in nature. Step B4 checks the length of the string R (the input string) and if that string is one character or less, the subroutine concludes. In the typical case the string R will be more than a single character long and therefore functions B5-B8 are performed. Function B8 tests the two character substring ST against the constant two character string containing two blanks or null characters. If that test shows an equality, then we merely increment past one of the two blanks (B11) and test (B12) to see if we have gone through the entire string. If not, we loop back to function B7. The loop of functions B7-B12 are performed until we have proceeded through the entire string. Each time the test (B8) is performed and produces an inequality, $L_5$ is incremented (B9). Until a pair of adjacent blanks or null character positions is found, when $L_5$ is incremented (B9) it will be equal to J, and therefore the function B10 does not change the input string. However, when the test (B8) is passed, then $L_5$ is not incremented but J is (B11). This has the effect of "skipping" one of the blank or null character positions and every succeeding character in the string is moved up. Thus at the conclusion of this loop (B12) all blank or null character positions appear as singletons. Thereafter function B13 stores the length of the string $L_5$ as $L_4$, and $L_5$ is re-initialized to unity. A loop (B16-B19) is entered to skip us past leading blanks. The function B20 begins the process of transferring the characters from the string R to the intermediate string NR. Functions B21 and B22 initialize parameters SP and EP (the starting and ending positions of the string) and at function B23 we test to see if we have incremented through the string. If not, we first re-initialize J to the starting position (SP) and enter a loop B25-B31 which will be used to transfer selected characters from the string R to the string NR. Those characters that will not be transferred are all blanks, but only special blanks, those which are adjacent to a LP or an RP. That is tested for at function B28. For all character positions which do not pass the test, we increment $L_5$ and append the character to NR. For characters which do pass the test, we do not append them to NR (and hence they are deleted). We continue this loop until our pointer J gets to EP (the end of the string). If the last character is a blank (tested for at B32) then it too is skipped. On the other hand, if it is not a blank, then it is appended to NR (function B34).

As a consequence of this processing, we have in the string NR, a string identical to the input R with two exceptions:

1. To the extent that the input string R included multiple adjacent blanks or null characters, these have each been reduced to a single blank or null character, and
2. To the extent that the input string R contained blanks which were adjacent to an RP or LP, those instances of blank or null characters have been deleted. Thereafter function B35 sets the string R equal to our processed string NR. This provides for "normalizing" our input string.

Once the annotated hierarchical information has been "normalized" by CANONIC, then the function ETREE is executed.

Referring to FIG. 7C1, it should be apparent that the steps C1-C9 are preparatory. The encoding rules described above are implemented at functions C10-C13. C10 is satisfied if the current string character (C) is LP, function C11 is satisfied if that character is RP, function C12 is satisfied if the character is a blank or null character. Satisfaction of any of these criteria branches to points 20, 21 or 22, respectively. If none of these functions is satisfied then the character position is an atom or part of an atom and it is appended to the string AB. Our counter (P) is incremented at function C14 and a test is effected at function C15 to see if we have proceeded through the entire string. If not, we loop back to perform the functions C10-C12 again.

If function C10 identified the character LP, then functions C20 et seq are performed. Firstly (C20) we determine if there is any atom in the string AB (that is if function C21 is satisfied). If there is, then we run ADDTO and ADDCHAR to build up first and second byproducts. ADDTO is run to insert the atom place holder in the first byproduct. ADDCHAR puts the atom into the second byproduct. Thereafter, or if we had not put any data into the string AB, ADDTO is run (C24) to insert the LP into the first byproduct.

On the other hand, if function C11 identifies the character RP, then functions C25 et seq are performed to effect processing similar to that already described. Finally, if function C12 is satisfied, then functions C30–C33 are performed.

The last time through there may or may not be any unused atom characters in the string AB and therefore functions C16 and C17 check for this possibility. If there are such characters then functions C18 and C19 are run. Otherwise, the subroutine concludes.

ADDCHAR is shown in FIG. 7D, and it includes the functions D1–D5. Function D3 increments our counter NA. We take our string (from the string AB), which is an atom that has been located, and add it or append it to our second byproduct A at function D4. Function D4, as shown in FIG. 7D also provides the string delimiter D in memory. As stated above, PL/1 does not require use of such a delimiter. Function D5 resets the string AB to enable the next atom to be accumulated.

FIG. 7E shows the subroutine ADDTO. The subroutine is entered with five arguments, LC, CD, WS, NS and E. These are, respectively, the last code value used when ADDTO was run, the current code value, a constant for any system indicating the number of nibbles per word, such that for a 2-bit nibble and an 8-bit word, WS is four, the number of symbols already in the first byproduct, and the first byproduct itself. It is the purpose of ADDTO to add a symbol to the first byproduct and to correspondingly increase or increment NS. The latter function is handled at E7, and the former is the subject of functions E8–E11. Each time ADDTO is called (C22, C24, C27, C29, C32), the particular value for CD is specified. When it is called at functions C22, C27 and C32, the purpose is to add a symbol to the first byproduct comprising a placeholder for an atom. When it is called at function C24 the purpose is to add a symbol to the first byproduct representative of an LP character, when it is called at function C29 the purpose is to add a RP character.

The processing branches at function E3 dependent on LC. As we will see, steps E4, E5 are skipped only for CODE (3) (LP). Test E4 is passed except for CODE (1) (RP). Step E5 is run to insert CODE (2) (blank) symbols between atoms (all other blanks have been deleted by CANONIC). Assuming that LC is neither CODE (1) or CODE (4), that is it represents a LP, processing branches directly to functions E6 et seq. On the other hand, if LC is either CODE (1) (representing a RP) or CODE (4) (representing an atom), then function E4 is performed to effect the branch on CD. If CD is a CODE (1) (a RP), then the processing also skips directly to E6. Alternatively, function E5 is performed, calling ADDTO itself with CD equal to CODE (2). This forces a blank into the first byproduct.

It is the purpose of ADDTO to add a 2-bit nibble corresponding to a particular code to the first byproduct E. To effect this, function E8 calculates an address of the byte which must be modified, and functions E9–E10 calculate the quantity of this modification; function E11 effects the modification. More particularly, K1 is an offset from the beginning of the first byproduct, at which is located that byte into which we will insert the desired symbol. Function E9 calculates a parameter K2 which will assist us in calculating the quantity to be inserted. Function E10 employs K2, the address generated in function E8 as well as CD to generate the modification and function E11 inserts that modification.

To illustrate, let's assume that we have already inserted 14 symbols (NS=15), that we have 8-bit bytes and a nibble designates two bits. Since we have already inserted 14 symbols, we have used up three bytes, and have put two symbols into the fourth byte, therefore we will be inserting a third symbol in the fourth byte. Function E8 runs QUANTIZE to calculate the designation of the fourth byte. Function E9 runs BASE4POWER to calculate that we are inserting the third symbol. Function E10 calculates the modification by extracting the value of the fourth symbol as previously stored, and adding to it the appropriate quantity, e.g. CD * K2. Once this quantity, denoted in E10–E11 by the variable V, is calculated, function E11 replaces the previous quantity stored in the fourth byte with the newly calculated value of V.

Returning now to FIG. 7A2, once function A12 is performed, the input string has been encoded in accordance with the invention to produce the first and second byproducts, E and A.

For further processing, for example to output the original annotated hierarchical information, functions A13 et seq are performed. Function A13 merely initializes some variables. The functions A14 through A24 merely output the encoded information corresponding to the first byproduct, e.g. allow it to be copied to another memory location or transmit it to another device. They will be described in more detail below.

Functions A25 through A39 perform a similar operation for the second byproduct encoded information.

Referring now to function A15, reference is made to FIG. 7J to show the subroutine HEX. Each time HEX is entered, it is entered with a parameter. J and it extracts the Jth component of the first byproduct E. HEX converts this byte to hexadecimal notation, e.g. in the range 0–F. Function A16 outputs, in hexadecimal format, an element of the first byproduct in both binary and hexadecimal. Function A17 initializes a pointer K, the number of the nibble, there are WS nibbles per byte. Functions A18–A24 form a loop. In the loop S is incremented and then compared (A19) with NS. If the test is passed (NS≧S) then the Kth nibble is displayed; since the Jth element is already converted to hex, the Kth nibble is easily extracted. Our nibble pointer, K, is then incremented (A21) and the test (A22) is effected. If K is not greater than WS we loop back. If K is greater than WS we increment the byte pointer J (A23). If we have not yet looked at all bytes we loop back to A15 and repeat the procedure. This is repeated until we have gone through every component of the first byproduct E.

Functions A25 through A33 will display the second byproduct, e.g. the list of atoms. Function A25 initializes our pointer (J) and our work string LN. Function A26 invokes the subroutine FINDL to determine the length of the Jth atom in A. FINDL is shown in FIG. 7L. Functions L1–L3 are preparatory. Function L4 merely increments P. Function F5 defines the string ZC as the Pth character of A. Function L6 tests ZC to see if it is equal to D. If it is not, we return to L4 and repeat the loop. When the test of L6 is satisfied we have incremented our character counter (P) to the end of the first atom of A. We now increment our atom counter R, L7.

In test L8 we compare J and R, if unequal we loop back to L4 and continue this loop until J=R. At that point Q (set at L9) defines the delimiter position preceding the Jth string and P defines the delimiter after the Jth string. Thus the expression P-Q-1 (L10) gives the length of the Jth atom. Function A27 tests to see if we have assembled an entire line. Assuming we have not, we take the first (J=1) atom and append it to our work string LN (function A30). Function A31 delimits this atom and function A32 increments our pointer. Function A33 tests to see if we have treated each atom in A. If not, we loop back to function A26 and again test at function A27 to see if we have an entire line.

Assuming we do not, then the preceding functions are repeated until the test at function A27 is passed. Function A28 displays the line LN and function A29 resets LN so that beginning at function A30 we can begin again. Functions A34-A36 display the last component of our second byproduct A on the assumption that we do have a complete 120 character line. In this fashion we output the entire second byproduct, e.g. A.

Functions A37-A38 decode the annotated hierarchical information to recreate the original annotated hierarchical information and display the same.

Referring now to DTREE (see FIG. 7F), functions F1-F5 are preparatory in nature. Function F6 calls GETFROM (FIG. 7G). GETFROM performs the reverse or inverse to the function performed by ADDTO, and that is ADDTO has taken four symbols and encoded them in a single byte; GETFROM will sequentially address this byte and extract the four symbols therefrom. Steps G1 and G2 are preparatory indicating that the input parameters to GETFROM are K (the symbol number), WS (the number of nibbles per word) and E (the first product); CD is the result, e.g. the code. Function G3 applies QUANTIZE (FIG. 7K). Based on the nibble pointer (K) and the parameter WS, QUANTIZE, when run, returns the address of the byte where the current code (CD) will be found. Function G4 runs BASE4POWER (FIG. 7I). As shown in FIG. 7I steps I1 and I2 are preparatory. Step I3 runs MODULO1 (FIG. 7H). As shown in FIG. 7H, steps H1 and H2 are preparatory, step H3 (denoting the nibble pointer K by $N_7$ and the number of symbols per byte WS by $N_8$), returns $N_9$. As we go through our list of symbols, K will be incremented, and as it does $N_9$ (the result of MODULO1) will sequentially take on the values 0-3, and repeat. When returning from MODULO1, function I4 (FIG. 7I) is performed. This computes $4^{WS - (K-1)}MOD\ WS$. On returning from BASE4POWER function G5 is performed. Thereafter function G6 runs BASE4POWER again to provide us with the parameter W4. In function G7 we set CD equal to the greatest integer which is less than or equal to W3/W4. On returning from GETFROM the tests of functions F7-F10 are performed. Depending on the value of CD that was calculated in GETFROM, one of the tests will be passed. For example if the CD is an RP, function F11 appends that symbol at the output location $O_f$. On the other hand, if test F8 is passed then function F12 appends the corresponding blank to the output location. Similarly, if test F9 s passed function F13 appends a LP symbol to the output location. If the code indicates that an atom is to be inserted at the output location (function F10) then the atom pointer is incremented (F14) and the atom pointed to is appended to the output location (F15, F18). More particularly, F15 invokes FINDA (FIG. 7M) to yield the string ZZ which is appended to the output location (F18). Referring to FIG. 7M, the reader will notice that M1-M10 are similar to L1-L9 and so the earlier description is applicable. When the test M9 is passed we have in Q the character position of the delimiter preceding the Jth atom, and P is the character position of the delimiter terminating the Jth atom. At M11 we increment Q and store in R (the character position of the first character in the Jth atom). At M12 we test to see if we are done. Assuming we are not we append the Rth character to the (initially) null string ZZ. We increment R (M14) and retest (M12). We continue until the test (M12) is passed, at which point ZZ is set to the Jth atom. Thereafter, function F16 increments the symbol pointer (K in F16) and function F17 is performed to see if we have proceeded through all the symbols. If not, we return to function F6 (GETFROM) and repeat the foregoing procedure. It should be apparent therefore then that we proceed through the encoded symbol list E. Each symbol is unpacked and decoded, and depending on the symbol itself we perform one of the necessary functions F11-F15. It should be apparent therefore that the processing effected by DTREE implements the decoding rules previously described.

Returning now to FIG. 7A3, once DTREE is exited (having proceeded through the entire list of symbols E), function A38 can be performed to display the resulting product.

The embodiment of the invention shown in FIG. 7, parts A-M, includes specific steps to add string delimiters to the second byproduct. Such steps are not essential to the invention. In a PL/1 environment, strings may be stored in an array. With such an environment an explicit string delimiter is unnecessary since the string boundaries can be readily identified by the array structure itself.

The preceding portions of this description have shown how hierarchical information in the form of an acyclic list can be encoded in accordance with the invention. That encoding process, in the description so far provided, was begun with the hierarchical information in the form of annotated hierarchical information in which the implicit spatial information and been manually added to the hierarchical information. A claim has been made, however, that the manual step of adding explicit spatial information is unnecessary to the invention, and indeed that step can also be performed by a properly programmed digital computer. To illustrate this particular feature of the invention, we apply the invention to hierarchical information, which was already stored in a machine, in accordance with some conventional word processing program. It should be understood that the invention has broad applicability beyond word processing (the invention can be applied to representing chemical structures), but since word processing is so widespread, application of the invention to word processing stored information is believed widely applicable.

In a typical word processing program, alpha-numeric information is stored along with positional information, so that when the alpha-numeric information is output (to a CRT or hard copy printer, or the like), the alpha-numerics will be positioned in an intelligible fashion to the reader. The positional information in a word processing program is explicit. For example, line endings are represented by a carriage return, and typically a carriage return implies a line feed as well. Thus the word processing program includes, for each line, a special character, CR (carriage return), which occupies a byte of memory and is located beyond the last character position on the line. The last character position on the line may be a space (which is an allowed character in most word processing programs). The leading alpha-numeric character on a line is located in memory beyond the preceding carriage return, and spaced by explicit positional information identifying the leading alpha-numeric character position on that line. This leading positional information can take a variety of forms, typically some mixture of tab characters and space characters. The leading alpha-numeric position is determined by summing the number of leading character spaces, and adding the sum to the product of the number of tab characters with the number of character spaces represented by each tab character. This quantity locates the leading alpha-numeric character position relative to the left margin. Both the left margin and the number of character spaces represented by a tab character, are variable quantities, typically under operator control. However, regardless of the value of each of these variables, at any position in the document the leading alpha-numeric character position on a line can always be determined in this fashion.

FIG. 9 is an example of how the first four lines of the text shown in FIG. 1A might be stored in accordance with a typical word processing program. FIG. 9 does not identify the left margin; typically the margins can be ignored inasmuch as the positional information we want to reproduce is relative, and so long as the left margin is constant throughout the text, it can be ignored. Of course if there is a change in the left margin, that change must be accounted for, but after reviewing the following description, those skilled in the programming art will easily be able to account for any changes in the left margin value. In the following example we have also assumed that the number of character spaces represented by a tab character is also constant. If this is not the case, such variation will also have to be accounted for, but again those skilled in the art will be able to account for such variations after reviewing the following description.

FIG. 9 illustrates (for generality) that each line begins with a tab character (T) and then a number of character spaces (#) before the leading alpha-numeric character. The first line has two such leading character spaces, the second, third and fourth lines each have three leading character spaces between the tab character and the leading alpha-numeric position. In accordance with the foregoing discussion, each of the lines shown in FIG. 9 is terminated by a carriage return (CR). The differences between the representation of FIG. 9 and that of FIG. 3 (which is of course the goal) are readily apparent. FIG. 3 does not include any tab characters, leading character spaces or carriage return characters. Instead the positional significance of these characters has been replaced by our LP and RP.

A first conclusion can be readily drawn by comparing FIGS. 3 and 9, and that is each carriage return (CR) is replaced by RP.

Turning our attention to the leading character spaces on the first line, we note that the first alpha-numeric character is preceded by a tab character and several character spaces (represented by the #). Assuming that the lines following the first line have their first alpha-numeric character no further to the left than the first alpha-numeric character on the first line and recognizing that positional information is substantially relative, we can provide almost any translation between the number of leading character spaces on the first line to the positional information we will use to represent those leading character spaces. In this example, the tab character and two character spaces have been replaced by three LPs.

When we get to the leading character spaces on the second line, we have to replace the leading tab character and the three leading character spaces with a representation which will allow the second line to be positionally aligned with the first. We can readily recognize that the first alpha-numeric position on the second line is located one right step relative to the first alpha-numeric character position on the first line. The question is, how many LPs should be used to represent this relationship. We use the same convention that we had used before (in connection with FIG. 4) that each LP corresponds to a +1, and each RP corresponds to a −1. We want the sum leading the first alpha-numeric character position on the second line to be one more than the sum preceding the first alpha-numeric character position on the first line. We have already determined that the sum for the first line is 3, taking into account the effect of the RP, at the end of the first line, would indicate then the absence of any LP characters leading the first alpha-numeric character position on the second line, that sum would be +2. However, since we want it to be +4, we must put in two LP characters leading the alpha-numeric position on the second line. Taking into account the RP at the end of the second line, there must be a single LP to give us the same sum of +4 preceding the leading alpha-numeric character position on the third line. In this fashion, the leading character position of every following line can be determined merely by noting the relationship to the preceding line, which relationship is explicitly identified by the information contained in the typical word processing program.

To implement, in a machine language algorithm, the foregoing, we need to select the number of leading LP characters for the first line, replace each carriage return with an RP character and then for the second and each succeeding line determine how many left or right shifts we need, by comparing the leading alpha-numeric character position for an arbitrary line with the leading alpha-numeric character position for the preceding line. We must add a number of LP characters leading an arbitrary line equal to one plus the number of right shifts (or one minus the number of left shifts). Left shifting is achieved by adding additional RP characters on the preceding line. A suitable algorithm, in flow chart form is shown in FIG. 10.

FIG. 10 is a suitable algorithm for accessing a document stored using conventional word processing techniques such as those exhibited in connection with FIG. 9, to modify the stored information and put it in the form of annotated hierarchical information. The algorithm or flow chart shown in FIG. 10 assumes that there is no text line which is further to the left than the initial line. After reviewing the description which follows, however, those skilled in the art will be able to modify the algorithm for this particular eventuality.

The first function shown in FIG. 10, F1, scans the document to create a table of line numbers in which the leading alpha-numeric character position in that line is identified by the number of character spaces between the leading alpha-numeric character position and the left margin. Function F2 deletes all leading tabs and leading character spaces. Function F3 replaces each carriage return (CR) with a RP character, and adds a LP in the leading position of each line.

The next function (F4) then initializes a counter. Function F5 computes the quantity $D = P_{n+1} - P_n$, that is the number of right shifts in the leading character position of the second line compared to the first. Function F7 then compares the computed quantity D to zero. If the computed quantity D is greater or equal to zero, then function F6 is performed, otherwise function F8 is performed. Function F6 adds that number of LP characters computed at function F5 to the line n+1. Function F8 adds that number of RP characters equal to the absolute value of D (as computed at function F5) to the end of line n. After either of functions F6 or F8 is performed, function F9 is performed to increment the counter. Function F10 determines whether or not we have incremented through each line in the document; if so, the processing is complete. On the other hand, if we have not incremented through each line of the document then processing loops back to function F5 where the preceding procedure is repeated until we have proceeded through each line in the document.

After processing a text grouping with the algorithm shown in FIG. 10, the result will be machine storage of annotated hierarchical information as is shown in FIG. 3. Thereafter, the invention proceeds in the manner already described.

Figure 11A:
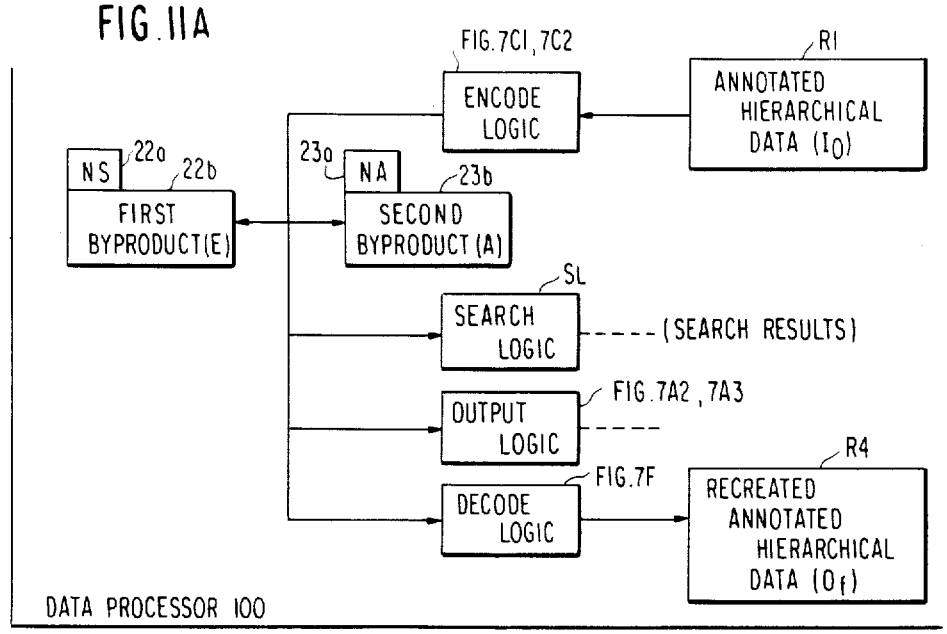
FIGS. 11A–C illustrate how the invention can be implemented with conventional data processors.
Figure 11B:
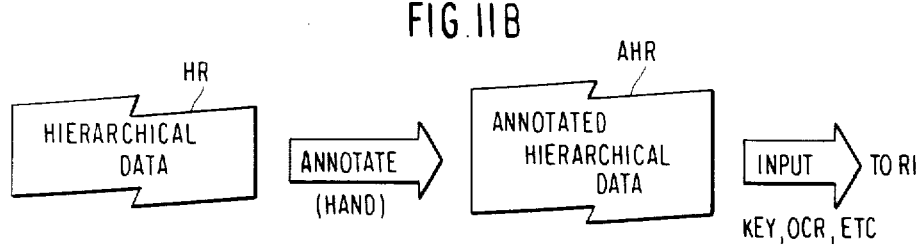
Figure 11C:
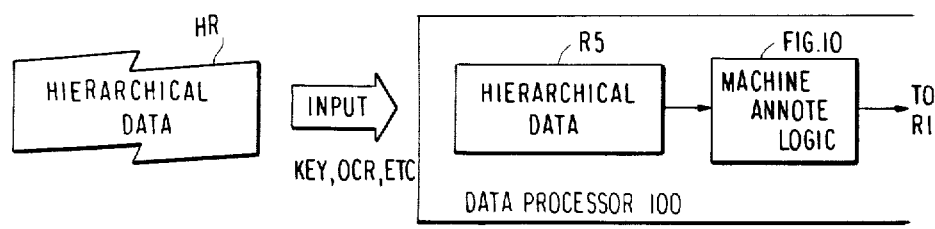

Having now explained the principles of the invention, and several alternatives, reference is made to FIGS. 11A-11C to show the invention may be implemented in practice.

FIG. 11A shows, in schematic fashion, a block diagram of a typical processor 100 which can be used in accordance with the invention. As shown in FIG. 11A, annotated hierarchical data ($I_O$) is located in the memory region R1 of the data processor 100. This annotated hierarchical data may be converted in accordance with the invention by running the encode logic (particular that shown in FIGS. 7C1, 7C2). The result is the first byproduct E and the number of symbols therein NS, which as shown in FIG. 11A may be stored in regions R2a and R2b of the data processor 100. A further result of the encode logic is the second byproduct (A) and the number of atoms (NA) and as shown in FIG. 11A this can be stored in a memory region R3a and R3b. Once the annotated hierarchical data has been encoded in accordance with the invention it can be searched, output or decoded. More particularly, FIG. 11A shows that to decode the information, the decode logic (particularly that shown in FIG. 7F) can be used to recreate the annotated hierarchical data ($O_f$) which may be stored in a further memory region R4 of the data processor 100. Alternatively, or in addition, the output logic (FIGS. 7A2, 7A3) can be used to output the first and second byproducts in its encoded form. Finally, the first and second byproducts can be applied to some search logic SL to produce search (or comparison) results. The search logic SL itself forms no part of the present invention, but as already described the search logic SL can be used to compare encoded versions of two annotated hierarchical data sets to each other either on the basis of the first byproduct, second byproduct, on the basis of both the first byproduct and the second byproduct. Those skilled in the art can after reviewing this description apply known technology to produce suitable search logic SL; one form of search logic that can be used is merely a simple comparison.

Typical hierarchical data now in use, whether in hard copy or machine stored versions, is not annotated in accordance with the invention. FIGS. 11B and 11C show two different arrangements by which conventional hierarchical data can be converted to annotated hierarchical data. FIG. 11B shows that the hierarchical data HR (for example in hard copy form) can be annotated by hand to produce annotated hierarchical data AHR (also in hard copy form). The annotated hierarchical data AHR may then be input to the data processor 100 using conventional techniques such as a keyboard, optical character reader, etc.

FIG. 11C shows an alternative version wherein the annotation of the hierarchical data is performed by the data processor 100. More particularly, as shown in FIG. 11C the hierarchical data HR is input in that form to a memory area R5 of the data processor 100. This input may be via a keyboard, optical character reader, etc. Once the hierarchical data is located in the memory region R5, the data processor 100 may apply the machine logic (for example of FIG. 10) to annotated the hierarchical data so as to load the memory region R1 of the data processor 100 with the annotated hierarchical data ($I_0$).

It should be apparent therefore that the foregoing description has shown how hierarchical data can be encoded to essentially two components, a first byproduct which consists essentially only of a sequence of symbols including spatial representing information and place holding information. In an embodiment of the invention which has been particularly described there are two different spatial representing symbols and two different place holding symbols. The fact that there are four symbols means that any one symbol requires only two bits to identify it, and for the conventional data processor 100 employing 8-bit bytes, we can pack four symbols per byte. The second byproduct consists essentially only of the strings or explicit information originally contained in the hierarchical data. The second byproduct is nearly devoid of spatial representing information. The second byproduct merely identifies the order of the atoms, it has no other spatial information. The description has further shown how the first and second byproducts may be employed to compare one set of such encoded hierarchical data with another set of encoded hierarchical data. In addition, although not described, it should be apparent that the hierarchical data in its encoded form can be amended or changed. The spatial relationship of the string information can be altered by amending the first byproduct. The contents of any string can be altered by locating the string in the second byproduct and amending it (adding or deleting characters). The string itself can be deleted so long as it and its place holding representative in the first byproduct are deleted. The foregoing has also described how the encoded hierarchical data can be output, in its encoded form and finally how the encoded hierarchical data can be decoded to recreate the original annotated hierarchical data. It should be apparent that many variations can be made in accordance with the invention without departing from the spirit and scope which is to be interpreted by the claims attached hereto.

I claim:

1. A method of encoding hierarchical information, which in a human readable form has informational content in both string form as well as in spatial arrangement, to a different format which is characterized by machine efficient storage, the method comprising the steps of:
(a) storing said hierarchical information in machine readable form,
(b) annotating said stored hierarchical information by proceeding through the stored hierarchical information to add explicit spatial information in the form of at least two different spatial characters,
(c) scanning said annotated hierarchical information and generating two byproduct strings to represent said hierarchical information,
(c-1) a first byproduct string comprising a sequence of a first symbol for each occurrence of a first of said two different spatial characters, a second symbol for each occurrence of a second of said two different spatial characters, a third symbol for every contiguous string in said hierarchical information, and a fourth symbol for every contiguous string of blanks in said hierarchical information,
(c-2) a second byproduct string comprising a sequence of strings and including every contiguous string from said hierarchical information, each contiguous non-blank string corresponding to a different occurrence of said third symbol in said first byproduct string, and
(d) storing the two strings produced by steps (c-1) and (c-2).

2. The method of claim 1 in which said step (c-1) includes the further step of:
replacing each of said four symbols with a different two bit combination so that each four sequential two bit combinations can be stored within a different byte of memory.

3. The method of claim 1 in which said hierarchical information is alphanumeric.

4. The method of claim 2 in which said hierarchical information is alphanumeric.

5. The method of claim 1 in which each line of said stored hierarchical information includes a count indicating a distance between a reference and an initial character of a line and in which said step b) includes:
(b-1) inserting prior to said initial character on a line one or more of said first spatial characters related to said count,
(b-2) inserting just prior to a line ending one or more of said second spatial characters.

6. The method of claim 1 in which said step (c) includes adding a string delimiter with each string from said annotated hierarchical information.

7. A machine implemented method of comparing spatial arrangements of two sets of hierarchical information comprising:
transforming one set of hierarchical information in accordance with the method of claim 1 to produce, in storage said first and second byproduct strings,
transforming the other set of hierarchical information in accordance with the method of claim 1 to produce, in storage third and fourth byproduct strings, respectively,
comparing the first and third byproducts to determine whether said first and second sets of hierarchical information are identical.

8. The method of claim 7 which includes the further step of:
comparing said second and fourth byproduct strings.

9. The method of recreating original hierarchical information with both string and spatial information from hierarchical information transformed and stored in accordance with the method of claim 1 comprising the steps of:

(e) accessing said first byproduct string at a start location,
(f) selecting an output location with a plurality of output positions sufficient to accommodate both said first and second byproduct strings,
(g) determining the identity of a first symbol in said first byproduct string,
(h) in dependence on said symbol and at said output location:
writing said first spatial character and advancing to a next position, or
writing said second spatial character and advancing to the next position, or
accessing said second byproduct string to reproduce a next string stored therein and advancing to the next position, or
writing a blank and advancing to the next position,
(i) advancing through said first byproduct string to determine the identity of the next symbol and repeat step (h) until all symbols of said first byproduct string are exhausted, and
(j) using said first and second spatial characters written at said output location to spatially align information at said output location other than said first and second spatial characters.

10. The method of claim 9 which includes the further step of:
(k) deleting all said first and second spatial characters from said output location.

11. A method of incorporating spatial information into machine readable hierarchical information to enable said hierarchical information to be efficiently machine searched against target hierarchical information with respect to string equality, spatial equality or overall equality, said method comprising the steps of:
(a) storing said machine readable hierarchical information in a form which includes information identifying a distance between an initial character on the line and an reference line,
(b) scanning said stored hierarchical information to add a pair of spatial characters thereto, one or more of a first spatial character inserted prior to an initial character on a line and one or more of a second spatial character inserted after a line ending, said spatial characters explicitly representing spatial information,
(c) scanning the result of step (b) to produce a pair of byproduct strings, a first byproduct string comprising four distinct symbols, each instance of a first symbol representing a different instance of said first spatial character, each instance of a second symbol representing a different instance of said second spatial character, each instance of a third symbol representing a different instance of a contiguous string in said hierarchical information and each instance of a fourth symbol representing each different string of blanks in said hierarchical information, and a second byproduct string comprising a sequence of the non-blank strings in said hierarchical information, and
(d) storing said first and second strings.

12. The method of claim 11 which further includes the step of:
(e) replacing each of said four symbols with a different two bit combination so that each sequence of four two bit combinations can be stored in a different memory byte.

13. The method of claim 11 in which said hierarchical information is alphanumeric.

14. The method of claim 12 in which said hierarchical information is alphanumeric.

* * * * *

UNITED STATES PATENT AND TRADEMARK OFFICE
CERTIFICATE OF CORRECTION

PATENT NO. : 4,803,651

DATED : February 7, 1989

INVENTOR(S) : Galkowski

It is certified that error appears in the above-identified patent and that said Letters Patent is hereby corrected as shown below:    Title page:

Abstract, lines 1, 3, 12, 20 and 23, "hierarchial" should be -hierarchical-;

line 8, "identation" should be -indentation-;

line 22, "tht" should be -that-.

Col. 3, line 13, -(- should be inserted before "for".

Col. 4, line 22, "to" (2nd) should be deleted.

Col. 8, line 1, "are" should be -is-;

line 22, -,- should be inserted after "parentheses".

Col. 9, line 19, "0's" should be read as "zero primes" (not "zeroes").

Col. 11, line 22, ($I_O$) should be -($I_0$);

line 33, "7C" should be -7Cl-.

Col. 13, line 65, "Ell" should be -E11-.

Col. 14, line 19, "Ell" should be -E11-;

Col. 14, line 38, delete ".".

Col. 15, line 62, "s" should be -is-.

Col. 16, line 42, "and" should be -had-.

Col. 19, line 30, -how- should be inserted after "show";

line 35, "($I_O$)" should be -($I_0$)-.

UNITED STATES PATENT AND TRADEMARK OFFICE
CERTIFICATE OF CORRECTION

PATENT NO. : 4,803,651

DATED : February 7, 1989

INVENTOR(S) : Galkowski

It is certified that error appears in the above-identified patent and that said Letters Patent is hereby corrected as shown below:

Col. 19, line 38, "particular" should be -particularly-;

line 64, -or- should be inserted before "on".

Col. 20, line 21, "annotated the" should be -the annotated-.

Col. 22, line 37, "an" should be -a-.

Signed and Sealed this

Eighth Day of August, 1989

Attest:

DONALD J. QUIGG

Attesting Officer

Commissioner of Patents and Trademarks